(12) United States Patent
Kamei et al.

(10) Patent No.: US 9,444,605 B2
(45) Date of Patent: Sep. 13, 2016

(54) BASE STATION

(71) Applicant: FUJITSU LIMITED, Kawasaki-shi, Kanagawa (JP)

(72) Inventors: Kenichi Kamei, Yokohama (JP); Shunichi Murasawa, Kawasaki (JP); Akihiro Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 14/079,303

(22) Filed: Nov. 13, 2013

(65) Prior Publication Data
US 2014/0071920 A1 Mar. 13, 2014

Related U.S. Application Data

(63) Continuation of application No. PCT/JP2011/062960, filed on Jun. 6, 2011.

(51) Int. Cl.
*H04W 4/00* (2009.01)
*H04L 5/00* (2006.01)
*H04W 92/20* (2009.01)
*H04W 72/04* (2009.01)
*H04W 72/12* (2009.01)

(52) U.S. Cl.
CPC ............. *H04L 5/0058* (2013.01); *H04L 5/001* (2013.01); *H04W 72/0486* (2013.01); *H04L 5/0037* (2013.01); *H04L 5/0053* (2013.01); *H04W 72/0453* (2013.01); *H04W 72/12* (2013.01); *H04W 92/20* (2013.01)

(58) Field of Classification Search
CPC ... H04L 5/0092; H04L 5/001; H04L 5/0032; H04W 92/20; H04W 76/025; H04W 72/042
See application file for complete search history.

(56) References Cited

U.S. PATENT DOCUMENTS

| | | |
|---|---|---|
| 2010/0027471 A1 | 2/2010 | Palanki et al. |
| 2011/0075611 A1 | 3/2011 | Choi |
| 2012/0044922 A1 | 2/2012 | Ishii |
| 2012/0202501 A1 | 8/2012 | Morioka et al. |

FOREIGN PATENT DOCUMENTS

| | | |
|---|---|---|
| JP | 2003-199144 | 7/2003 |
| JP | 2011-004161 | 1/2011 |

(Continued)

OTHER PUBLICATIONS

3GPP TR 36.912 V10.0.0; 3rd Generation Partnership Project; Technical Specification Group Radio Access Network; "Feasibility study for Further Advancements for E-UTRA (LTE-Advanced) (Release 10)"; Mar. 2011.

(Continued)

*Primary Examiner* — Yemane Mesfin
*Assistant Examiner* — Abdelillah Elmejjarmi
(74) *Attorney, Agent, or Firm* — Fujitsu Patent Center

(57) ABSTRACT

A transmitting unit of a base station transmits data to a radio terminal with a plurality of frequency bands. A transfer unit of the base station transfers a part of data to be transmitted by the transmitting unit to another base station, so that data transmission to the radio terminal is performed in the other base station. A receiving unit of the other base station receives data transferred by the transfer unit of the base station. A transmitting unit of the other base station transmits data received by the receiving unit to the radio terminal.

8 Claims, 26 Drawing Sheets

(56) References Cited

FOREIGN PATENT DOCUMENTS

| JP | 2011-097443 | | 5/2011 | |
|----|----|----|----|----|
| JP | EP2544496 | A1 * | 1/2013 | ............ H04W 72/04 |
| JP | EP2582168 | A1 * | 4/2013 | ............ H04W 16/28 |
| WO | 2010/126105 | A1 | 11/2010 | |
| WO | 2010/129223 | A2 | 11/2010 | |
| WO | 2011/063244 | A2 | 5/2011 | |

OTHER PUBLICATIONS

3GPP TR 36.913 V10.0.0; 3rd Generation Partnership Project; Technical Specification Group Radio Access Network; "Requirements for further advancements for Evolved Universal Terrestrial Radio Access (E-UTRA) (LTE-Advanced) (Release 10)"; Mar. 2011.

LG Electronics; "Consideration on CoMP in LTE-Advanced"; Agenda Item: 11.4; 3GPP TSG RAN WG1 Meeting #55; R1-084203; Prague, Czech Republic; pp. 1-5, Nov. 10-14, 2008.

MediaTek Inc.; "Handover with Carrier Aggregation"; Agenda Item: 7.1.02; 3GPP TSG-RAN WG2 #69; R2-101144; San Francisco, USA; pp. 1-6, Feb. 22-26, 2010.

International Search Report issued for corresponding International Patent Application No. PCT/JP2011/062960, mailed Aug. 16, 2011.

EESR—the extended European search report issued on Sep. 29, 2014 for corresponding European Application No. 11867226.0.

Alcatel-Lucent, "Component carrier indication for bandwidth extension in LTE-A", 3GPP TSG-RAN WG1 #58, Aug. 24-28, 2009, R1-093362.

Fujitsu, "Anchor component carrier", 3GPP TSG-RAN1 #55bis, R1-090382, Jan. 12-16, 2008.

Research in Motion, UK Limited, "Support of Carrier Aggregation with Heterogeneous Deployment of Component carriers", Agenda Item 15.4, R1-093289, pp. 1-4, 3GPP TSG RAN WG1 Meeting #58, Shenzhen, China, Aug. 24-28, 2009.

CNOA—Chinese Office Action issued on May 31, 2016 for corresponding Chinese Application No. 201180071360.5.

* cited by examiner

FIG. 1
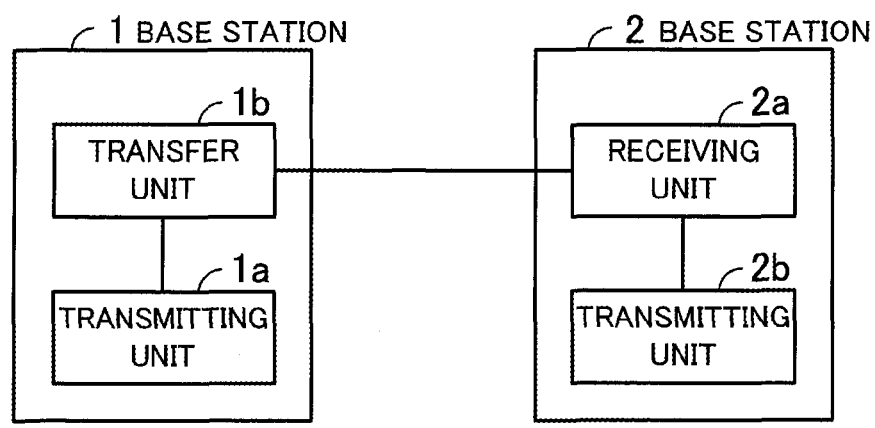
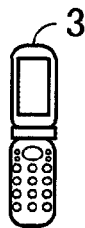

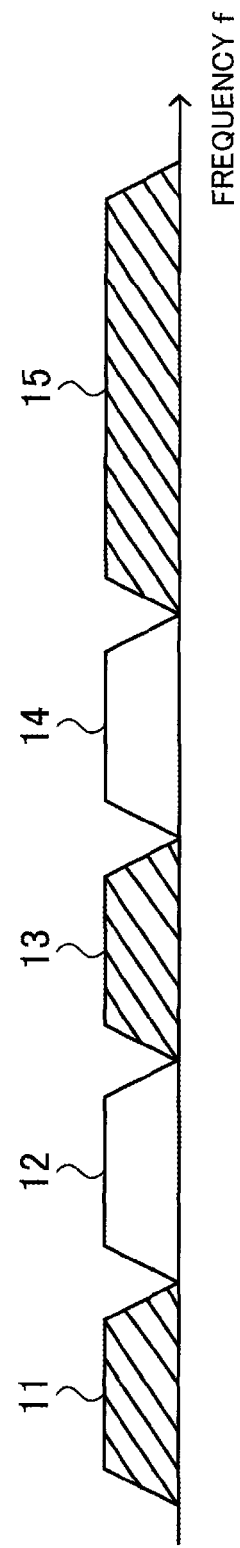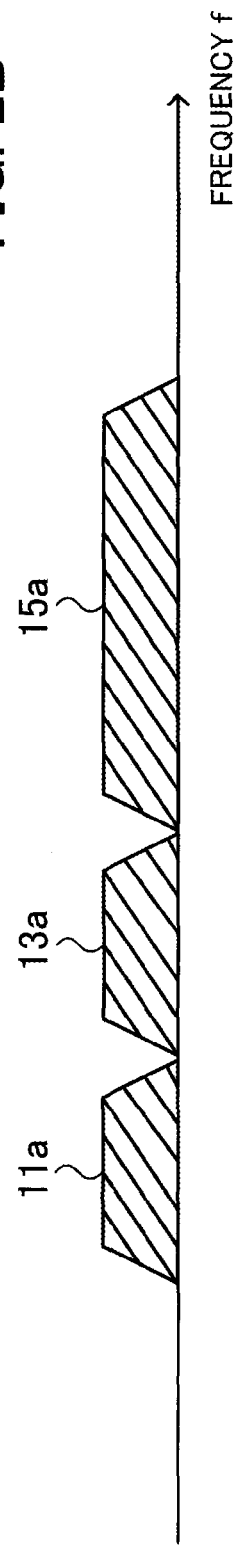

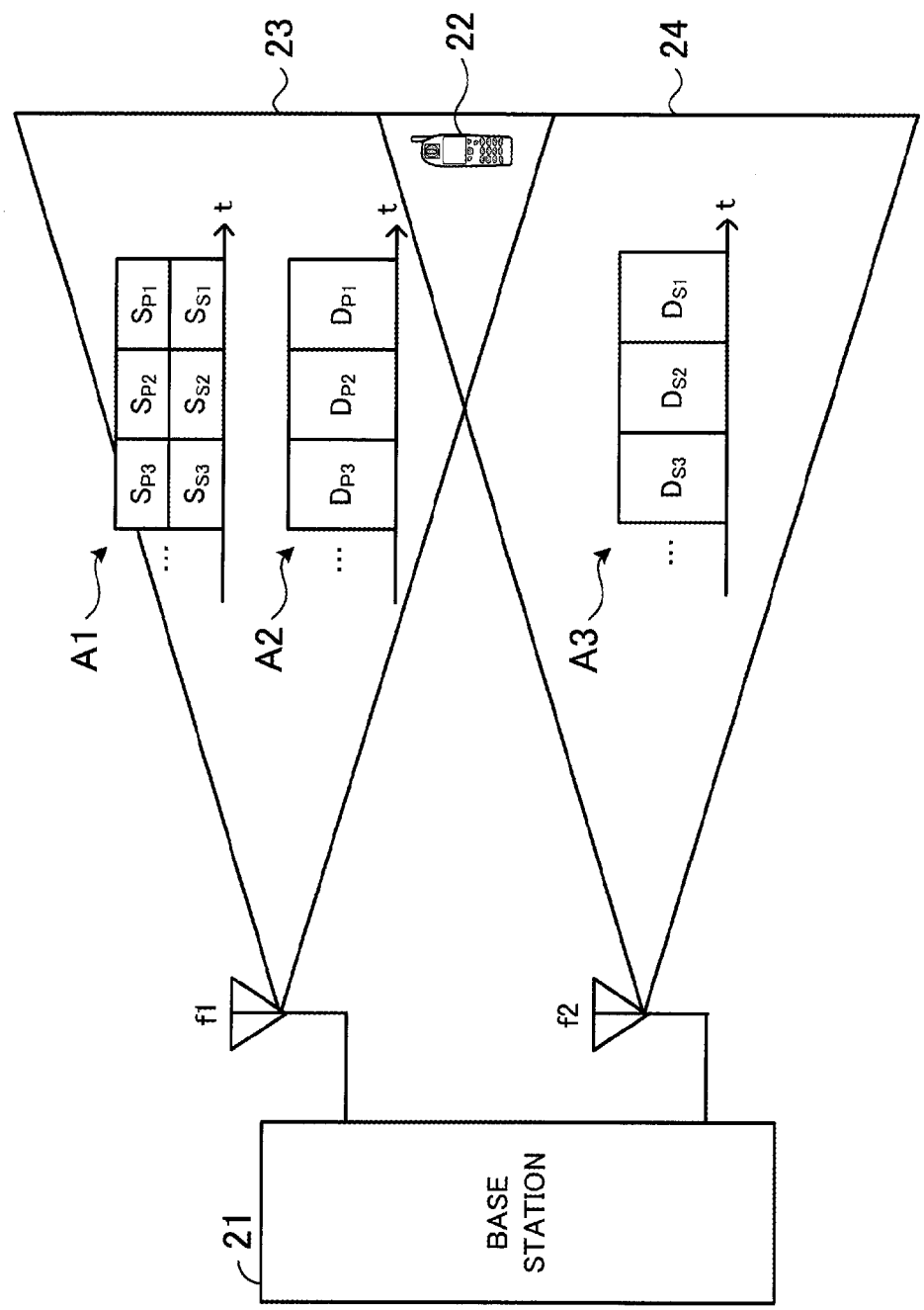

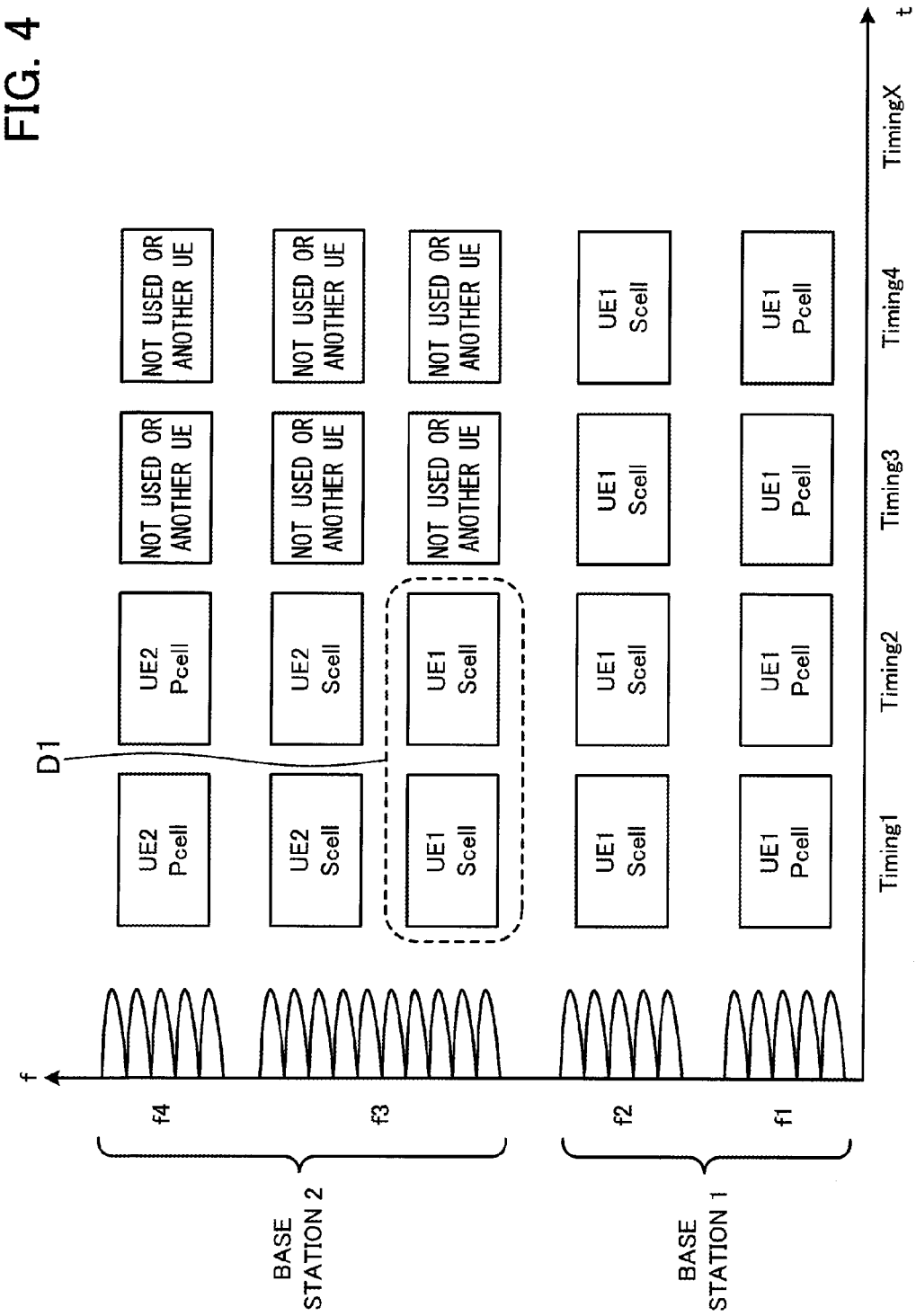

FIG. 17

| PRIORITY ORDER | QCI | RETENTION AMOUNT THRESHOLD VALUE | NON-TRANSMITTED DATA RETENTION AMOUNT (Byte) | RETENTION TIME THRESHOLD VALUE | NON-TRANSMITTED DATA RETENTION TIME (ms) |
|---|---|---|---|---|---|
| UE#2 | 2 | 50 | 200 | 150 | 150 |
| UE#1 | 6 | 100 | 50 | 300 | 100 |
| ⋮ | ⋮ | ⋮ | ⋮ | ⋮ | ⋮ |

FIG. 18

| OWN STATION FREQUENCY BAND INFORMATION | ANOTHER STATION FREQUENCY BAND INFORMATION | UE FREQUENCY BAND INFORMATION | |
|---|---|---|---|
| | | UE 34 | ... |
| f1 | − | f1 | ... |
| f2 | − | f2 | ... |
| − | f3 | f3 | ... |
| − | f4 | − | ... |
| − | − | − | ... |

FIG. 20

71 TRANSMISSION BUFFER MANAGEMENT TABLE

| PRIORITY ORDER | QCI | RETENTION AMOUNT THRESHOLD VALUE | NON-TRANSMITTED DATA RETENTION AMOUNT (Byte) | RETENTION TIME THRESHOLD VALUE | NON-TRANSMITTED DATA RETENTION TIME (ms) |
|---|---|---|---|---|---|
| UE#2 | 2 | 50 | 200 | 150 | 150 |
| UE#1 | 6 | 100 | 50 | 300 | 100 |
| ⋮ | ⋮ | ⋮ | ⋮ | ⋮ | ⋮ |

A11

72 TRANSMISSION BUFFER MANAGEMENT TABLE

| PRIORITY ORDER | QCI | RETENTION AMOUNT THRESHOLD VALUE | NON-TRANSMITTED DATA RETENTION AMOUNT (Byte) | RETENTION TIME THRESHOLD VALUE | NON-TRANSMITTED DATA RETENTION TIME (ms) |
|---|---|---|---|---|---|
| UE#2 | 2 | 50 | 200 | 150 | 150 |
| UE#3 | 8 | 500 | 20 | 300 | 0 |
| UE#4 | 8 | 500 | 10 | 300 | 0 |
| ⋮ | ⋮ | ⋮ | ⋮ | ⋮ | ⋮ |

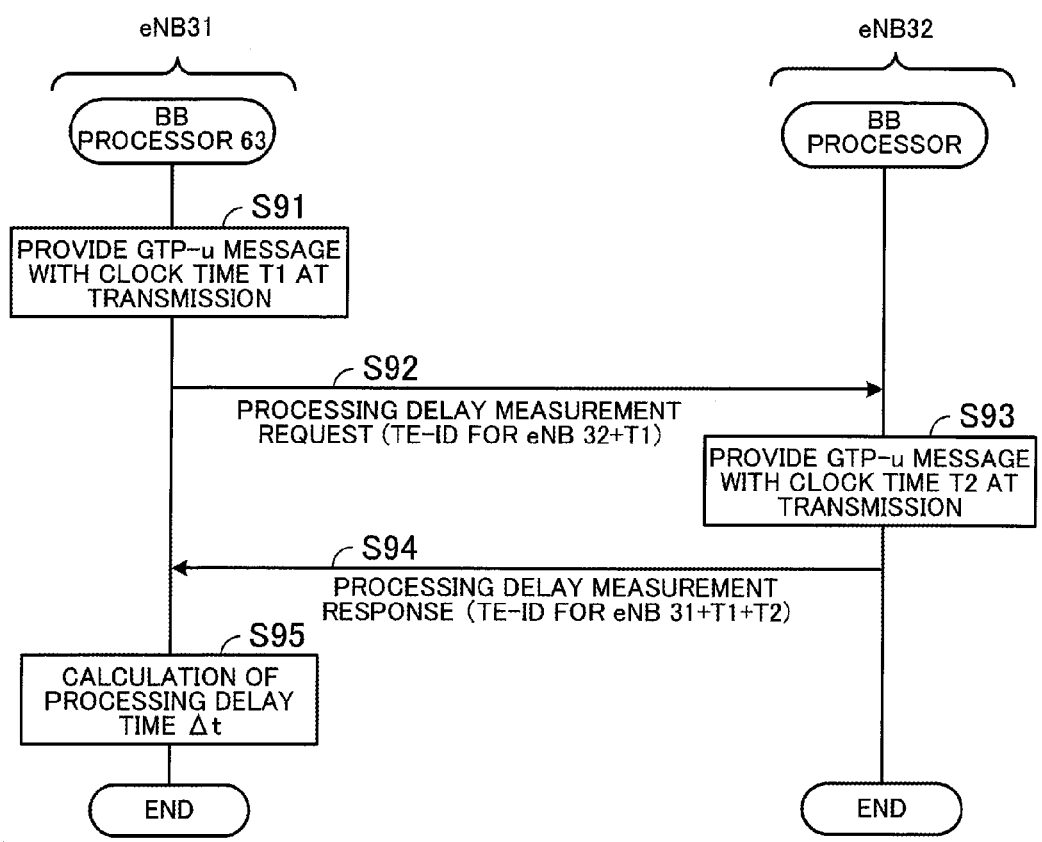

FIG. 25

| Octets | Bits | | | | | | | |
|---|---|---|---|---|---|---|---|---|
| | | 8 | 7 | 6 | 5 | 4 | 3 | 2 | 1 |
| 1 | | 0x01 |||||||
| 2 | | Extension Header Length |||||||
| 3 | | SFN |||||||
| 4 | | SFN |||| Subframe Number ||||
| 5 | | Resource Block Assignment Information |||||||
| ⋮ | | ⋮ |||||||
| n | | Next Extension Header Type (note) |||||||

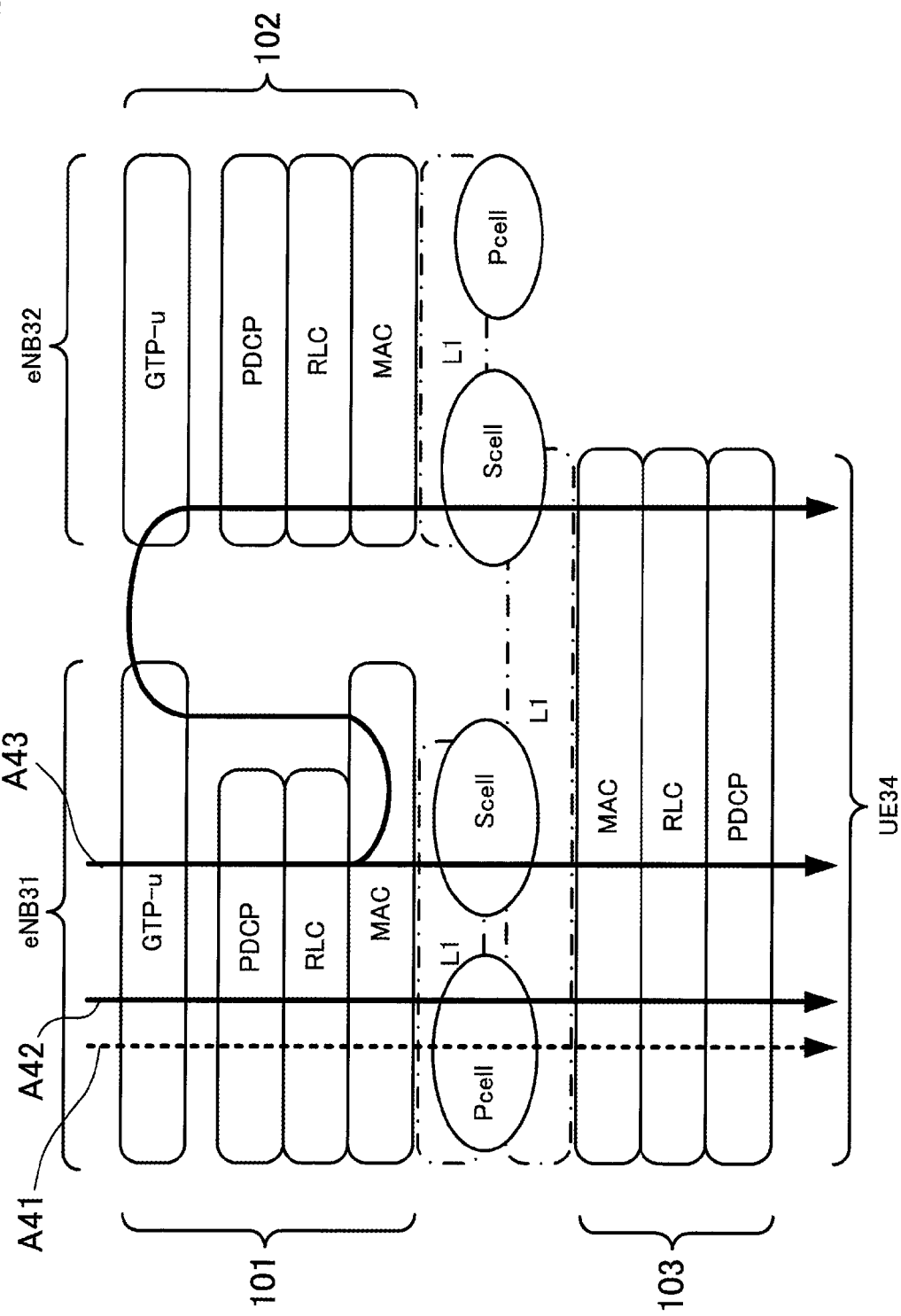

BASE STATION

CROSS-REFERENCE TO RELATED APPLICATION

This application is a continuation application of International Application PCT/JP2011/062960 filed on Jun. 6, 2011 which designated the U.S., the entire contents of which are incorporated herein by reference.

FIELD

The present embodiment relates to a base station.

BACKGROUND

Currently, a mobile communication system such as a mobile phone system is used widely, and in order to achieve higher speed and larger capacity of radio communication, a discussion has been performed continuously with respect to a next generation mobile communication technology.

For example, in the 3GPP (3rd Generation Partnership Project) international standardization organization, a standard referred to as LTE (Long Term Evolution) has been proposed. In addition, a standard referred to as LTE-A (LTE-Advanced) with the LTE extended has also been proposed. In standardization of the LTE-A, an investigation for providing higher-speed data communication has been carried out, and in order to realize it, a wide frequency band will be needed. On the other hand, because frequencies will be allocated avoiding existing allocated frequency bands, it is difficult to allocate a wide frequency band contiguously.

As a countermeasure for that, a carrier aggregation (CA: Carrier Aggregation) technology which uses a plurality of frequency bands in downlink communication and processes the frequency bands integrally on a baseband of a UE (User Equipment) has been investigated. In the CA technology, each frequency band is referred to as a component carrier (CC: Component Carrier).

Besides, conventionally, in a communication system which performs cooperative communication, mainly with respect to a pre-coding process, a communication system which performs an adaptive control efficiently has been proposed (for example, refer to Japanese Laid-Open Patent Publication No. 2011-004161).

In addition, conventionally, a resource control system has been proposed which enables improvement in Qos and effective use of resources in consideration of the whole system by achieving cooperation with resource control of an own cell and neighboring cells (for example, refer to Japanese Laid-Open Patent Publication No. 2003-199144).

However, hereafter, an information society will progress, and higher speed and larger capacity of data communication are desired.

SUMMARY

According to an aspect of the embodiments to be discussed herein, there is provided a base station, including: a transmitting unit configured to transmit data to a radio terminal using a plurality of frequency bands; and a transfer unit configured to transfer a part of data to be transmitted in the transmitting unit to another base station so that data transmission to the radio terminal is performed in the other base station, wherein the transmitting unit starts data transmission with the plurality of frequency bands based on both or one of a retention amount and retention time of data to be transmitted to the radio terminal, and the transfer unit starts data transfer based on both or one of the retention amount and the retention time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a base station according to a first embodiment;
FIGS. 2A and 2B are part 1 of figures illustrating CA;
FIG. 3 is a part 2 of figures illustrating the CA;
FIG. 4 illustrates radio resource allocation of a radio terminal of FIG. 1;
FIG. 17 illustrates a transmission buffer management table;
FIG. 18 illustrates selection of monitoring frequency bands;
FIG. 20 illustrates determination of priority order in another station;
FIG. 21 is a sequence diagram illustrating a processing delay measuring process of data transfer;
FIG. 25 illustrates a data format example of data transferred to the eNB of another station;
and
FIG. 26 illustrates a data flow in a downlink layer.

DESCRIPTION OF EMBODIMENTS

Figure 5:
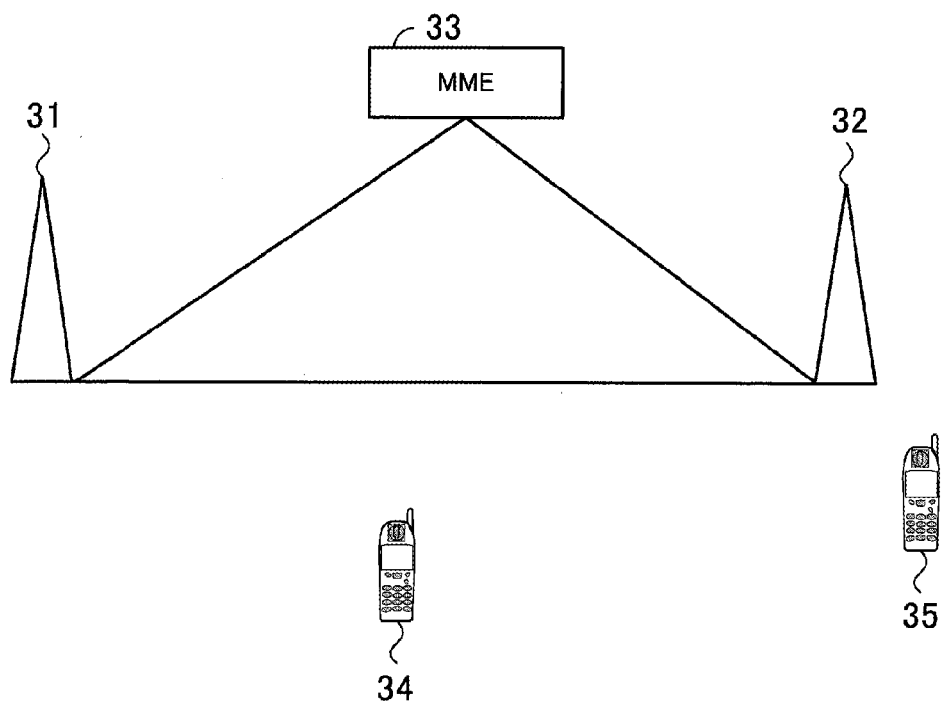
FIG. 5 illustrates an example of a radio communication system according to a second embodiment.

Several embodiments will be described in detail below with reference to drawings.

[First Embodiment]

FIG. 1 illustrates a base station according to a first embodiment. In FIG. 1, base stations 1 and 2, and a radio terminal 3 are illustrated. The base station 2 is an adjacent base station of the base station 1, for example. The radio terminal 3 is a mobile phone, for example. As illustrated in FIG. 1, the base station 1 has a transmitting unit 1a and a transfer unit 1b.

The transmitting unit 1a performs data transmission to the radio terminal 3 by CA. The transfer unit 1b transfers, to the base station 2, a part of data to be CA-transmitted to the radio terminal 3 by the transmitting unit 1a, so that data transmission to the radio terminal 3 is performed in another base station 2.

The base station 2 has a receiving unit 2a and a transmitting unit 2b. The receiving unit 2a receives data transferred from the transfer unit 1b of the base station 1. That is, the receiving unit 2a receives, from the base station 1, a part of the data which the base station 1 CA-transmits to the radio terminal 3. The transmitting unit 2b transmits the data received by the receiving unit 2a to the radio terminal 3.

The CA will be described. FIGS. 2A and 2B are part 1 of figures illustrating the CA. In FIGS. 2A and 2B, band examples in a radio communication system of the CA are illustrated. FIG. 2A illustrates frequency bands on a radio frequency, and FIG. 2B illustrates frequency bands on a baseband of a radio terminal.

In a radio communication system in which the CA is not performed, a base station and a radio terminal perform radio communication with a single frequency band. On the other hand, in the radio communication system which carries out the CA, a base station and a radio terminal perform radio communication with a plurality of frequency bands.

For example, the base station and radio terminal perform radio communication with a plurality of frequency bands 11, 13 and 15, as illustrated in FIG. 2A. Note that frequency bands 12 and 14 illustrate frequency bands of radio communication systems of other companies, for example.

The radio terminal, on the baseband, as illustrated in FIG. 2B, performs signal processing with a plurality of frequency bands 11a, 13a and 15a integrated. That is, the radio terminal performs data communication with the base station with a frequency band wider than the single frequency band, and performs signal processing thereof.

FIG. 3 is a part 2 of figures illustrating the CA. In FIG. 3, a base station 21 and a radio terminal 22 are illustrated. The base station 21 forms a cell 23 of a frequency band f1, and a cell 24 of a frequency band f2, as illustrated in FIG. 3.

When the radio terminal 22 is connected to the base station 21, a frequency band allocated to the radio terminal 22 is referred to as a primary frequency band. In addition, a cell of the primary frequency band is referred to as a primary cell (Pcell).

For example, assume that the frequency band f1 is allocated to the radio terminal 22 when the radio terminal 22 is connected to the base station 21. In this case, the cell 23 serves as the Pcell of the radio terminal 22. The radio terminal 22 performs data transmission and reception in the Pcell (cell 23) in a state where the radio terminal 22 is first connected to the base station 21.

The base station 21, when including a CA function, makes an inquiry to the radio terminal 22 about in which frequency bands the radio terminal 22 may perform communication. The radio terminal 22 sends a reply with communicable frequency bands, in response to the inquiry from the base station 21.

The base station 21 selects a frequency band which allows communication with the radio terminal 22, among frequency bands other than the primary frequency band which are provided by the base station 21. The selected frequency band is referred to as a secondary frequency band. In addition, a cell of the secondary frequency band is referred to as a secondary cell (Scell). The base station 21 instructs the radio terminal 22 to perform communication in the selected Scell. The instruction is performed using the Pcell.

For example, assume that the base station 21 has received frequency bands f1 and f2 from the radio terminal 22 as communicable frequency bands. In this case, the base station 21 selects the cell 24 as the Scell. Then, the base station 21 instructs the radio terminal 22 to perform communication also in the Scell (cell 24). Thereby, the base station 21 and the radio terminal 22 may perform radio communication based on the CA with a plurality of frequency bands f1 and f2.

Downlink Scheduling is performed in PDCCH (Physical Downlink Control Channel) of the Pcell. In addition, adding, changing and releasing of the Scell are performed in the PDCCH of the Pcell. In addition, downlink data transmission is performed in PDSCH (Physical Downlink Shared Channel) of each of the Pcell and Scell.

For example, an arrow A1 illustrated in FIG. 3 indicates the PDCCH. An arrow A2 indicates the PDSCH of the Pcell. An arrow A3 indicates the PDSCH of the Scell. The PDCCH indicated by the arrow A1 illustrates transmission of scheduling of the PDSCH of the Pcell indicated by the arrow A2 and the PDSCH of the Scell indicated by the arrow A3.

In this way, in the CA, the base station 21 and the radio terminal 22 perform radio communication with a plurality of frequency bands f1 and f2. Thereby, the base station 21 and the radio terminal 22 may perform radio communication in a frequency band wider than the single frequency band, and achieve higher speed and larger capacity of data communication.

Description will be returned to the description of FIG. 1. As described above, the transmitting unit 1a of the base station 1 in FIG. 1 performs data transmission to the radio terminal 3 by the CA. The transfer unit 1b transfers the part of the data transmitted by the transmitting unit 1a to the base station 2, so that a part of data transmitted by the transmitting unit 1a to the radio terminal 3 may be transmitted to the radio terminal 3 also in another base station 2. The receiving unit 2a of the base station 2 receives the data transferred by the transfer unit 1b of the base station 1, and the transmitting unit 2b transmits the data received by the receiving unit 2a to the radio terminal 3.

FIG. 4 illustrates radio resource allocation of the radio terminal of FIG. 1. A horizontal axis illustrated in FIG. 4 indicates time, and a vertical axis indicates frequency.

The base station 1 illustrated in FIG. 1 is assumed to be able to perform radio communication with frequency bands f1 and f2, for example as illustrated in FIG. 4. In addition, the base station 2 is assumed to be able to perform radio communication with frequency bands f3 and f4 In addition, the radio terminal 3 is assumed to be able to perform radio communication with the frequency bands f1 to f3. Note that a UE 1 illustrated in FIG. 4 corresponds to the radio terminal 3 in FIG. 1. A UE 2 corresponds to a radio terminal served by the base station 2, which is not illustrated in FIG. 1.

The transmitting unit 1a of the base station 1 transmits data to the radio terminal 3 with a plurality of frequency bands by the CA. For example, as illustrated in FIG. 4, radio resources of frequency bands f1 and f2 are allocated to the radio terminal 3 (UE 1). Note that in FIG. 4, the frequency band f1 is assumed to be the Pcell, and the frequency band f2 is assumed to be the Scell.

The transfer unit 1b of the base station 1 transfers the part of data to the base station 2, so that a part of data transmitted by the transmitting unit 1a is transmitted to the radio terminal 3 also in another base station 2. The receiving unit 2a of the base station 2 receives the data transferred from the transfer unit 1b of the base station 1, and the transmitting unit 2b transmits the data received by the receiving unit 2a to the radio terminal 3 with frequency bands different from frequency bands of the CA of the transmitting unit 1a of the base station 1.

For example, data in a dotted line frame D1 illustrated in FIG. 4 illustrates the data which are transferred to the base station 2 from the base station and addressed to the radio terminal 3. The data transferred to the base station 2 from the base station 1, in FIG. 4, is allocated to radio resources of the frequency band f3 of the base station 2.

That is, the base station 1 adds the frequency band f3 of another base station 2 to frequency bands f1 and f2 of the CA of the base station 1, as the secondary frequency band, and allows data transmission to be performed to the radio terminal 3 also from another base station 2. Besides, when radio resources of a plurality of frequency bands are not used in the base station 2, the base station 2 may allocate the data transferred from the base station 1 to the plurality of frequency bands.

In this way, the transfer unit 1b of the base station 1 is designed to transfer a part of the data to be CA-transmitted by the transmitting unit 1a to another base station 2, so that data transmission to the radio terminal 3 may be performed in another base station 2. In addition, it is designed such that the receiving unit 2a of the base station 2 receives the data transferred by the transfer unit 1b of the base station 1, and the transmitting unit 2b transmits the received data to the radio terminal 3. Thereby, since the base station 1 adds the frequency band of another base station 2 to the CA of the base station 1 and performs data transmission to the radio terminal 3, it is possible to achieve higher speed and larger capacity of data communication.

[Second Embodiment]

Next, a second embodiment will be described in detail with reference to drawings.

FIG. 5 illustrates an example of a radio communication system according to the second embodiment. As illustrated in FIG. 5, the radio communication system has eNBs 31 and 32, an MME (Mobility Management Entity) 33, and UEs 34 and 35. As illustrated in FIG. 5, the eNBs 31 and 32 are connected mutually. Between the eNBs and 32, an S-GW (Serving-GateWay) may exist, for example. In addition, the eNBs 31 and 32 are connected via the MME 33.

Figure 6:
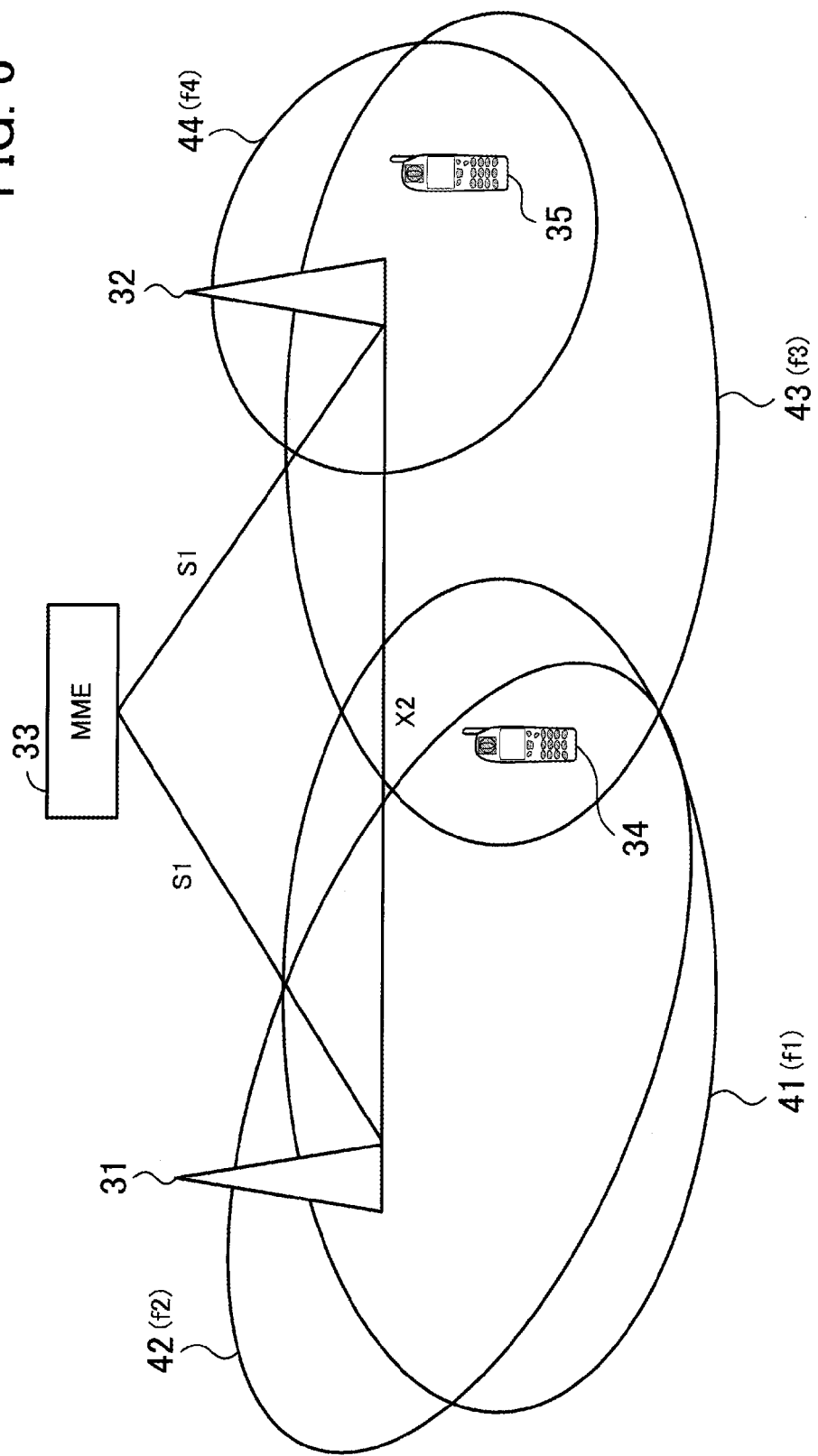
FIG. 6 illustrates an operation of the radio communication system of FIG. 5.

FIG. 6 illustrates an operation of the radio communication system of FIG. 5. In FIG. 6, the same symbol is given to the same one as in FIG. 5.

The eNBs 31 and 32 are connected by an X2 interface. In addition, the eNB 31 and the MME 33 are connected with an S1 interface. In addition, the eNB 32 and the MME 33 are connected by an S1 interface.

The eNB 31 may perform radio communication with the UEs 34 and 35 with frequency bands f1 and f2, for example. A cell 41 indicates a cell of the frequency band f1, and a cell 42 indicates a cell of the frequency band f2.

The eNB 32 may perform radio communication with the UEs 34 and 35 with frequency bands f3 and f4, for example. A cell 43 indicates a cell of the frequency band f3, and a cell 44 indicates a cell of the frequency band f4.

The UE 34 may perform radio communication with frequency bands f1 to f3, for example. Note that in FIG. 6, since the UE 34 belongs to cells 41 to 43 of frequency bands f1 to f3, respectively, the UE 34 may perform radio communication with both the eNB 31 and the eNB 32.

The UE 35 may perform radio communication with frequency bands f1, f3 and f4, for example. Note that in FIG. 6, since the UE 35 belongs to cells 43 and 44 of frequency bands f3 and f4, respectively, the UE 35 may perform radio communication with the eNB 32.

The eNB 31 may perform data transmission to the UE 34 by the CA. For example, when a retention amount and retention time of data transmitted to the UE exceed a prescribed threshold value, the eNB 31 performs data transmission to the UE 34 by the CA in the Pcell (for example, cell 41) and the Scell (for example, cell 42). In addition, when the UE 34 may perform radio communication with another eNB 32, the eNB 31 transfers to the eNB 32 a part of data to be CA-transmitted to the UE 34.

That is, the eNB 31 adds to the CA of the eNB 31 the cell 43 of the eNB 32 as the Scell, and performs data transmission to the UE 34. That is, the UE 34 receives data from two eNBs of the eNB 31 and eNB 32.

Figure 7:
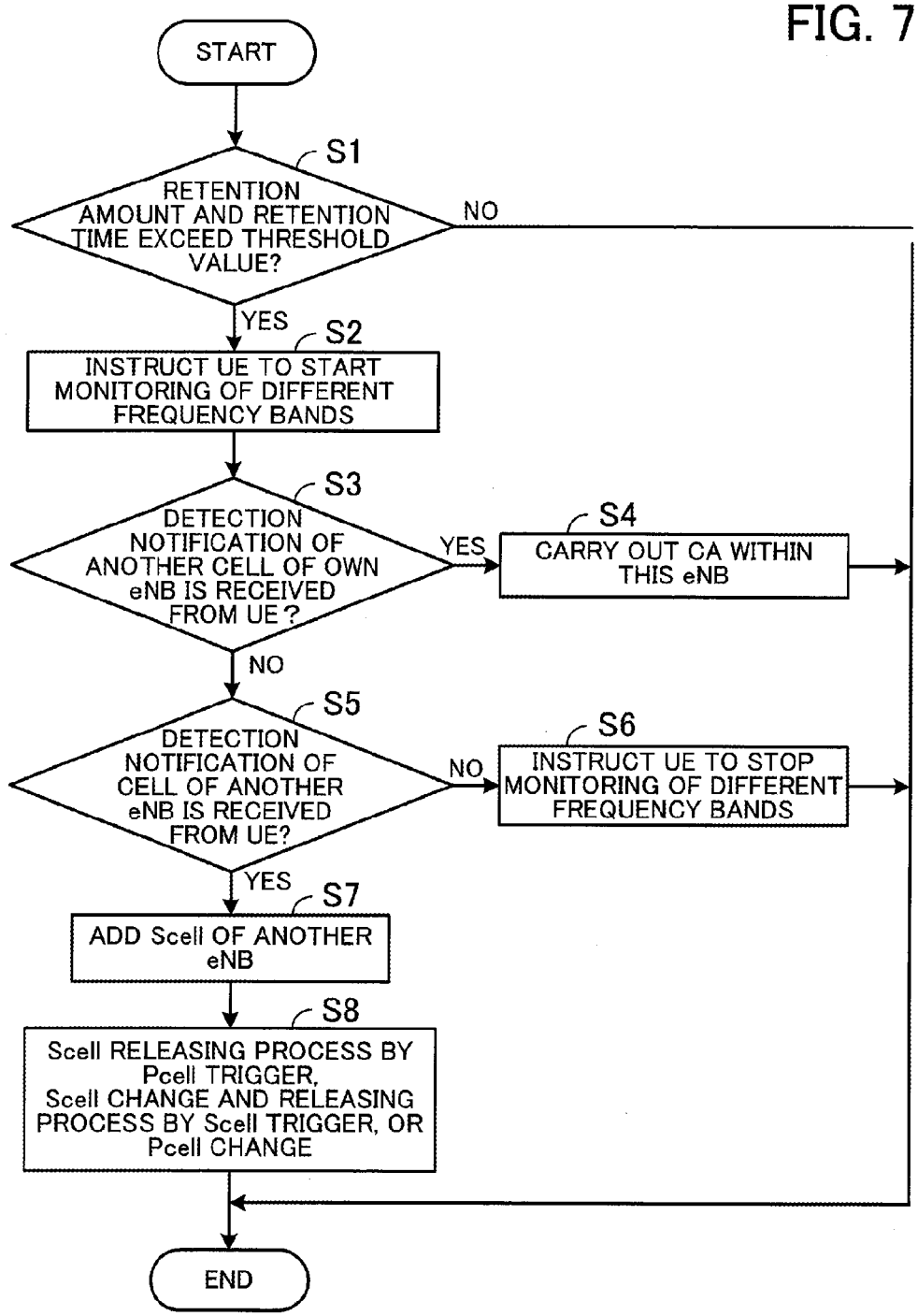
FIG. 7 is a flow chart illustrating an operation of an eNB.

FIG. 7 is a flow chart illustrating an operation of the eNB. In FIG. 7, a flow chart of the eNB 31 of FIG. 6 is illustrated. In FIG. 7, it is assumed that the UE 34 has the cell 41 of the eNB 31 as the Pcell, and is connected to the eNB 31.

[Step S1] The eNB 31 determines whether or not the retention amount and retention time of the data to be transmitted to the UE 34 exceed a prescribed threshold value. When the retention amount and retention time of the data to be transmitted to the UE 34 exceed the prescribed threshold value, the eNB 31 proceeds to Step S2. When the retention amount and retention time of the data to be transmitted to the UE 34 do not exceed the prescribed threshold value, the eNB 31 terminates the process.

[Step S2] The eNB 31 instructs the UE 34 to perform monitoring of a frequency band different from the frequency band f1 of the Pcell (cell 41). That is, the eNB 31 instructs the UE 34 to monitor a frequency band which is different from the frequency band f1 and with which radio communication with the eNB 31 may be performed.

[Step S3] The eNB 31 determines whether having received a detection notification of the other cells (the other frequency bands different from the Pcell) of the eNB 31, from the UE 34. For example, the eNB 31 determines whether having received the detection notification of the cell 42 (frequency band f2), from the UE 34. The eNB 31, when having received the detection notification of the other cells of the eNB 31 from the UE 34, proceeds to Step S4. The eNB 31, when not having received the detection notification of the other cells of the eNB 31 from the UE 34, proceeds to Step S5.

[Step S4] The eNB 31 carries out CA within the eNB of the eNB 31. For example, the eNB 31, when having received a detection result of the cell 42 from the UE 34 in Step S3, carries out CA with the cell 42 as the Scell.

[Step S5] The eNB 31 determines whether having received a detection notification of cells in another eNB 32 from the UE 34. For example, the eNB 31 determines whether having received the detection notification of cells 43 and 44 (frequency bands f3 and f4) from the UE 34. The eNB 31, when having received the detection notification of cells in another eNB 32 from the UE 34, proceeds to Step S7. The eNB 31, when having not received the detection notification of cells in another eNB 32 from the UE 34, proceeds to Step S6. Note that in an example of FIG. 6, the eNB 31 receives the detection notification of the cell 43 from the UE 34.

[Step S6] The eNB 31 instructs the UE 34 to stop monitoring of different frequency bands (frequency bands other than the frequency band of the Pcell).

[Step S7] The eNB 31 has a cell of another eNB 32 added as the Scell. For example, the eNB 31 adds the cell 43 of another eNB 32 to the Scell. The eNB 31 transfers, to the eNB 32, a part of data to be transmitted to the UE 34, and the eNB 32 transmits, to the UE 34, the data transferred from the eNB 31 in the Scell (cell 43).

[Step S8] The eNB 31 performs release and change processing of the Scell, and change processing of the Pcell.

For example, the eNB 31 releases the Scell, when it is determined that congestion of data to be transmitted to the UE 34 is dissolved by the CA.

In addition, the eNB 31, when there is a request for change or release processing of the Scell from the eNB 32, performs the change or release processing of the Scell of the eNB 32. For example, the eNB 32, when a UE having a higher priority of data transmission than the UE 34 starts communication, notifies the eNB 31 of changing the Scell of the UE 34 so as to reduce the Scell or of releasing the Scell.

In addition, the eNB 31 changes the Pcell to a cell of a frequency band whose communication quality is good. For example, when the UE 34 moves, a frequency band whose communication quality is good changes. In this case, the eNB 31 makes a cell of a frequency band whose communication quality is the best be the Pcell.

Note that the eNB 31 performs operation of the flow chart illustrated in FIG. 7, with respect to all the UEs belonging to the Pcell of the eNB 31.

In addition, the eNB 31 performs operation of the flow chart illustrated in FIG. 7 repeatedly. Therefore, the eNB 31, when the retention amount and retention time of the data to be transmitted to the UE exceed a prescribed threshold value after carrying out CA at Step S4 of FIG. 7, will have the Scell of another eNB 32 added by Step S7, for example.

In addition, the eNB 31 repeatedly performs operation of the flow chart illustrated in FIG. 7. Thereby, if the retention amount and retention time of the data to be transmitted to the UE 34 exceed a prescribed threshold value even when a cell of another eNB 32 is added as the Scell, the eNB 31 may add another cell of another eNB 32 as the Scell.

In addition, the determination by the eNB 31 whether to start the CA (processing of Step S1) may be determined by one of the retention amount and retention time of data. For example, the eNB 31, when one of the retention amount and retention time of the data to be transmitted to the UE 34 exceeds a prescribed threshold value, may proceed to processing of Step S2. With respect to the retention amount and retention time which appear below, the same process will be carried out.

FIGS. 8 to 12 are sequence diagrams of the radio communication system. In FIGS. 8 to 12, sequences of the eNBs 31 and 32 and UE 34 illustrated in FIG. 6 are illustrated.

[Step S11] The eNB 31 and the UE 34, on the basis of an RRC (Radio Resource Control) connection sequence, establish the RRC connection.

[Step S12] The eNB 31 establishes the Pcell. For example, the eNB 31, when a communication quality of the cell 41 is good among cells 41 and 42 in which communication with the UE 34 is performed, makes the cell 41 be the Pcell.

[Step S13] The eNB 31 and the UE 34 establish a bearer.

[Step S14] The eNB 31 detects whether a retention amount and retention time of a buffer in which data to be transmitted to the UE 34 are stored temporarily have exceeded a prescribed threshold value. That is, the eNB 31 detects whether the retention amount and retention time of the data to be transmitted to the UE 34 have exceeded a prescribed threshold value. Here, the eNB 31 is assumed to have detected that the retention amount and retention time of the data to be transmitted to the UE 34 have exceeded the prescribed threshold value.

[Step S15] The eNB 31 makes an RRC connection reconfiguration request to the UE 34 in order to establish a call with the UE 34. At this time, the eNB 31 instructs the UE 34 to monitor communicable frequency bands in frequency bands other than the Pcell.

[Step S16] The UE 34 returns a response to the RRC connection reconfiguration request, to the eNB 31, at Step S15 (RRC connection reconfiguration complete).

[Step S17] The UE 34 returns a measurement result of the monitoring to the eNB 31. The UE 34 returns the frequency band f2 (alternatively, Cell-ID (IDentifier) of the cell 42) and the frequency band f3 (alternatively, Cell-ID of the cell 43), for example, to the eNB 31.

Figure 8:
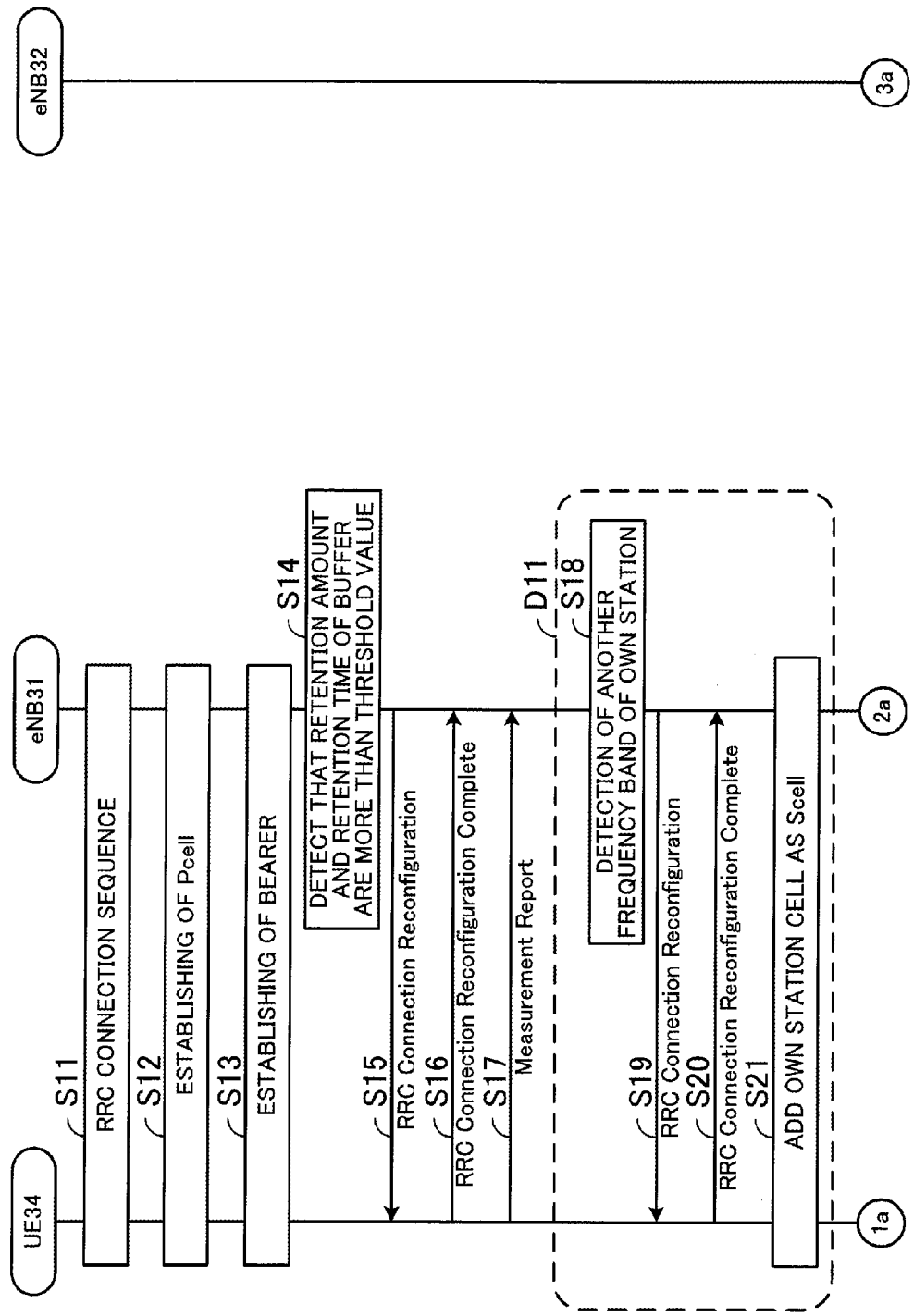
FIG. 8 is a sequence diagram of the radio communication system.

A dotted line frame D11 indicated in FIG. 8 illustrates processing in a case where monitoring measurement results measured by the UE 34 are frequency bands of the eNB 31.

[Step S18] The eNB 31 detects the other frequency bands (frequency bands different from the Pcell) of the eNB 31 from the monitoring results from the UE 34. For example, the eNB 31 receives the frequency band f2 from the UE 34.

[Step S19] The eNB 31 makes an RRC connection reconfiguration request to the UE 34 in order to establish a call with the UE 34.

[Step S20] The UE 34 returns a response to the RRC connection reconfiguration request at Step S19, to the eNB 31.

[Step S21] The eNB 31 has a cell of the eNB 31 added as the Scell. For example, the eNB 31, when having received the frequency band f2 as another frequency band of the eNB 31 at Step S18, has the cell 42 added as the Scell. The eNB 31 notifies the UE 34 of the added Scell. For example, the eNB 31 notifies the UE 34 of the added Scell by the Cell-ID.

Figure 9:
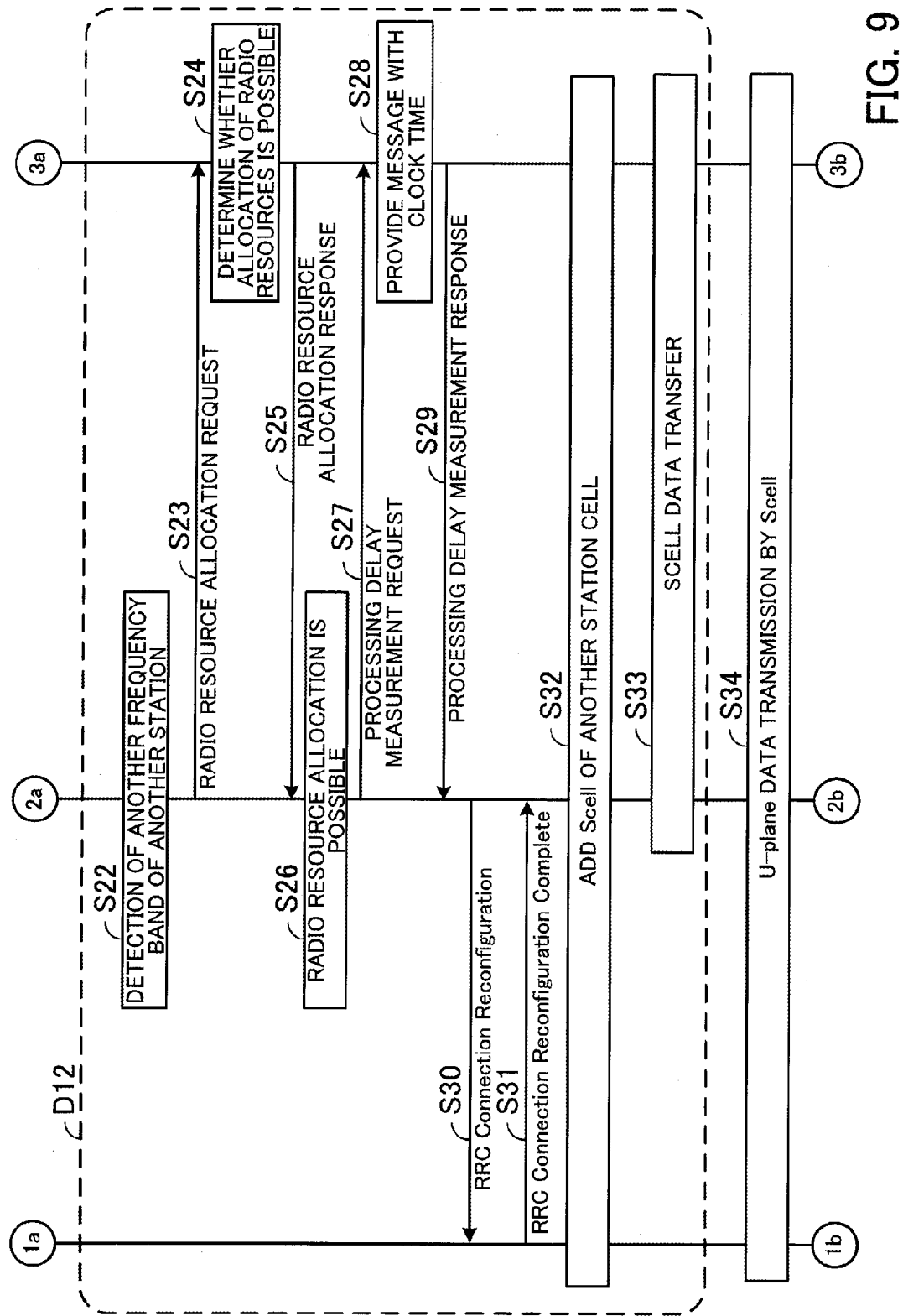
FIG. 9 is a sequence diagram of the radio communication system.

A dotted line frame D12 indicated in FIG. 9 illustrates processing in a case where monitoring measurement results measured by the UE 34 are frequency bands of another station (eNB 32).

[Step S22] The eNB 31 detects another frequency band of another station (different frequency band from the Pcell) from the monitoring results from the UE 34. For example, the eNB 31 receives the frequency band f3 (alternatively, the Cell-ID) from the UE 34.

[Step S23] The eNB 31 makes a radio resource allocation request to the eNB 32. For example, the eNB 31 makes an allocation request for allocating the radio resources of the frequency band f3 in order to add the cell 43 in the frequency band f3 of the eNB 32 to the Scell.

[Step S24] The eNB 32 determines whether or not the allocation of radio resources is possible. For example, the eNB 31 determines whether or not radio resources of the frequency band f3 may be allocated to the UE 34.

[Step S25] The eNB 32 returns the determination result of whether or not radio resources may be allocated, to the eNB 31.

[Step S26] The eNB 31 receives a result that allocation of radio resources is possible. Note that the eNB 31, when having received a result that allocation of radio resources is not possible, and having had the Scell of the eNB 31 added, will perform data communication with the UE 34 in the Pcell and Scell of the eNB 31. In addition, the eNB 31, when having received a result that allocation of radio resources is not possible, and having not had the Scell of the eNB 31 added, will perform data communication with the UE 34 in the Pcell.

[Step S27] The eNB 31 makes a processing delay measurement request to the eNB 32. This, when the eNB 31 has a cell of the eNB 32 of another station added as the Scell and performs data transmission to the UE 34, transfers a part of data to be transmitted to the UE 34 to the eNB 32. The data transfer causes a time difference between a time for the eNB 31 to perform data transmission to the UE 34 and a time for the eNB 32 to perform data transmission to the UE 34. Then, the eNB 31 measures a time for data transfer to the eNB 32 in order to perform scheduling in consideration of the time for performing data transfer to the eNB 32.

[Step S28] The eNB 32, upon receiving the processing delay measurement request from the eNB 31, provides a message with a receipt time of the processing delay measurement request.

[Step S29] The eNB 32 transmits the message provided with the receipt time, to the eNB 31. Note that the eNB 31 measures the time for data transfer, based on a clock time at which the processing delay measurement request is made and the receipt time provided to the message.

[Step S30] The eNB 31 makes an RRC connection reconfiguration request to the UE 34 in order to establish a call with the UE 34.

[Step S31] The UE 34 returns a response to the RRC connection reconfiguration request at Step S30 to the eNB 31.

[Step S32] The eNB 31 has a cell of another station added as the Scell. For example, the eNB 31 has the cell 43 of the frequency band f3 of the eNB 32 added as the Scell. The eNB 31 notifies the UE 34 of the added Scell. For example, the eNB 31 notifies the UE 34 of the added Scell by the Cell-ID.

[Step S33] The eNB 31 transfers a part of data to be transmitted to the UE 34, to the eNB 32.

[Step S34] The eNBs 31 and 32 transmit data (U-plane data) to the UE 34 by the Scell. The eNB 31 transmits the data also by the Pcell, to the UE 34.

Figure 10:
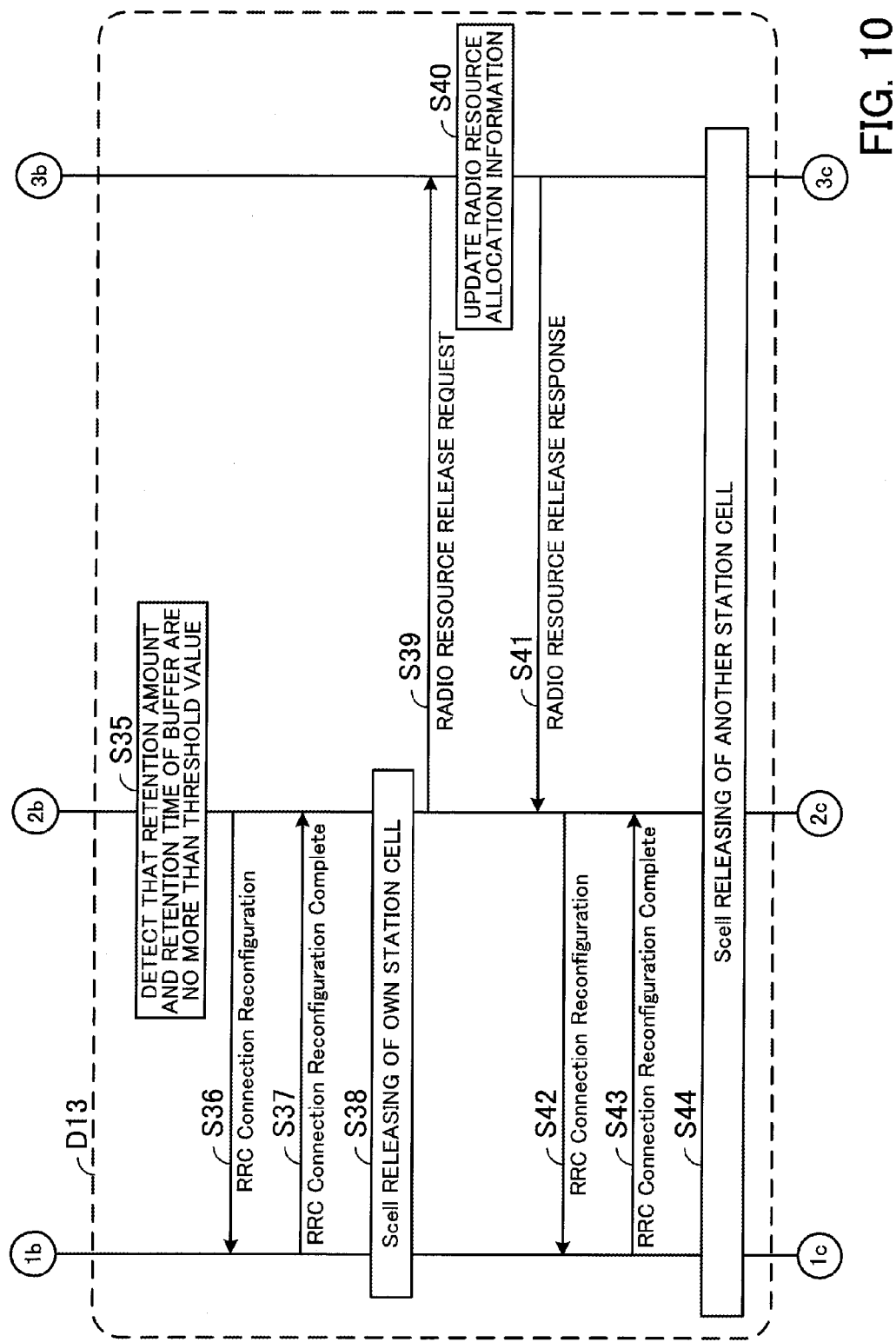
FIG. 10 is a sequence diagram of the radio communication system.

A dotted line frame D13 illustrated in FIG. 10 illustrates processing in a case where the retention amount and retention time of the buffer for the data to be transmitted to the UE 34 become no more than a prescribed threshold value.

[Step S35] The eNB 31 detects whether the retention amount and retention time of the buffer for temporarily storing the data to be transmitted to the UE 34 are no more than the prescribed threshold value. That is, the eNB 31 detects whether the retention amount and retention time of the data to be transmitted to the UE 34 have become no more than the prescribed threshold value. Here, the eNB 31 is assumed to have detected that the retention amount and retention time of the data to be transmitted to the UE 34 have become no more than the prescribed threshold value.

[Step S36] The eNB 31 makes an RRC connection reconfiguration request to the UE 34 in order to establish a call with the UE 34.

[Step S37] The UE 34 returns a response to the RRC connection reconfiguration request at Step S36 to the eNB 31.

[Step S38] The eNB 31 releases the Scell of the eNB 31. For example, the eNB 31 releases the cell 42. The eNB 31 notifies the UE 34 that the Scell of the eNB 31 has been released.

[Step S39] The eNB 31 makes a release request of radio resources of the Scell to the eNB 32.

That is, the eNB 31, when data congestion of the UE 34 is reduced, releases the Scells of the eNB 31 and another station. Then, the eNB 31 transmits the data of the UE 34 only by the Pcell.

[Step S40] The eNB 32, upon receiving the radio resource release request from the eNB 31, updates radio resource allocation information. For example, the eNB 32 updates the radio resource allocation information so as to indicate that radio resources of the frequency band f3 which have been allocated to the UE 34 have been released.

[Step S41] The eNB 32 transmits a radio resource release response to the eNB 31.

[Step S42] The eNB 31 makes an RRC connection reconfiguration request to the UE 34 in order to establish a call with the UE 34.

[Step S43] The UE 34 returns a response to the RRC connection reconfiguration request at Step S42, to the eNB 31.

[Step S44] The eNB 31 notifies the UE 34 that the Scell of another station cell has been released. For example, the eNB 31 notifies the UE 34 that the cell 43 of the Scell of the eNB 32 has been released.

Figure 11:
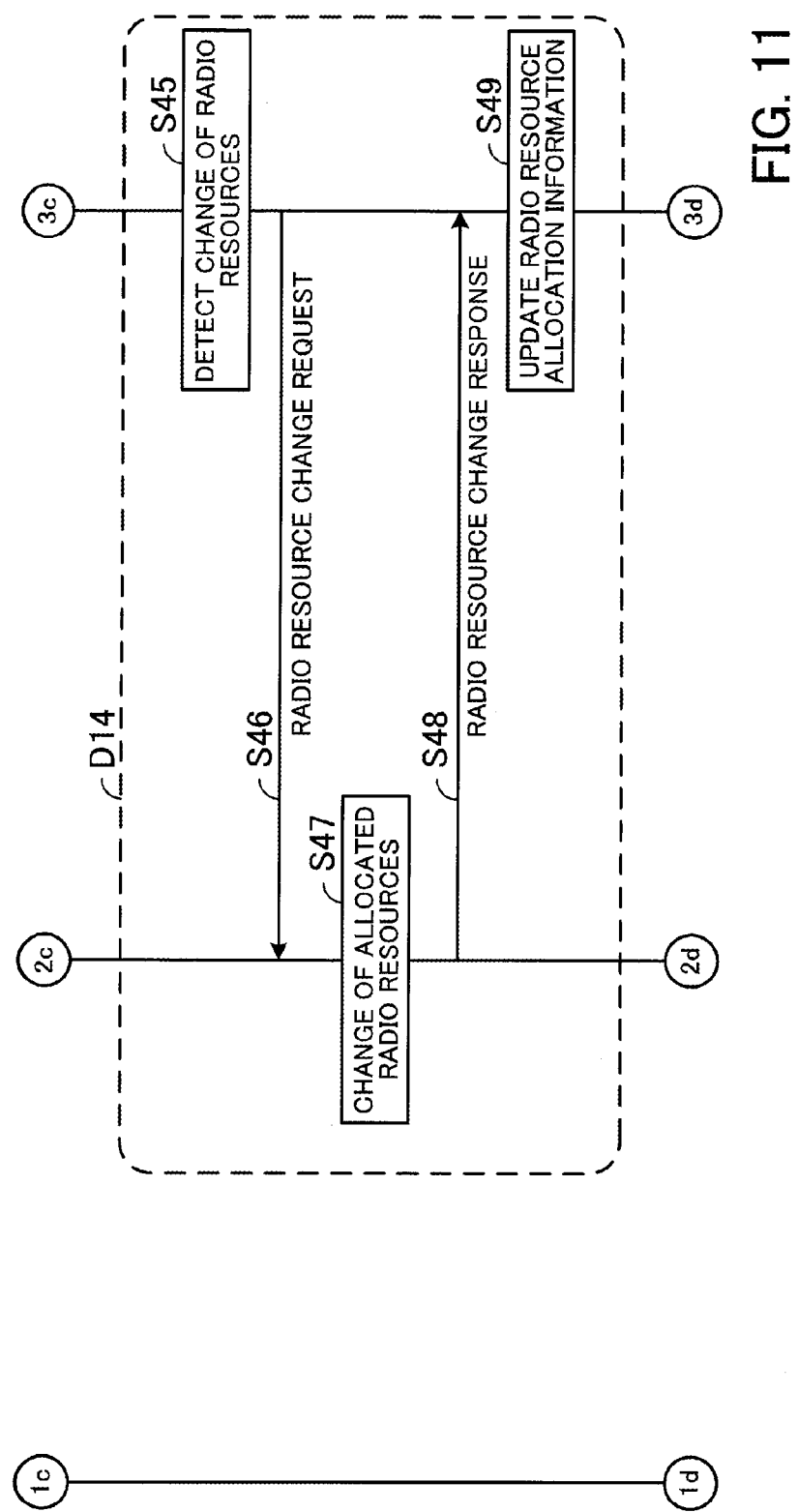
FIG. 11 is a sequence diagram of the radio communication system.

A dotted line frame D14 indicated in FIG. 11 illustrates change processing of radio resources of the Scell.

[Step S45] The eNB 32 detects change of radio resources which have been allocated to the UE 34. For example, when a part of radio resources allocated to the UE 34 is allocated to a UE having higher priority than the UE 34, the eNB 32 detects the change of the radio resources.

[Step S46] The eNB 32 transmits a radio resource change request to the eNB 31.

[Step S47] The eNB 31 changes radio resources to be allocated to the UE 34.

[Step S48] The eNB 31 transmits a radio resource change response to the eNB 32.

[Step S49] The eNB 32 updates radio resource allocation information of the UE 34. For example, the eNB 32 updates the radio resource allocation information so as to indicate that radio resources of the frequency band f3 which have been allocated to the UE 34 have been reduced.

Figure 12:
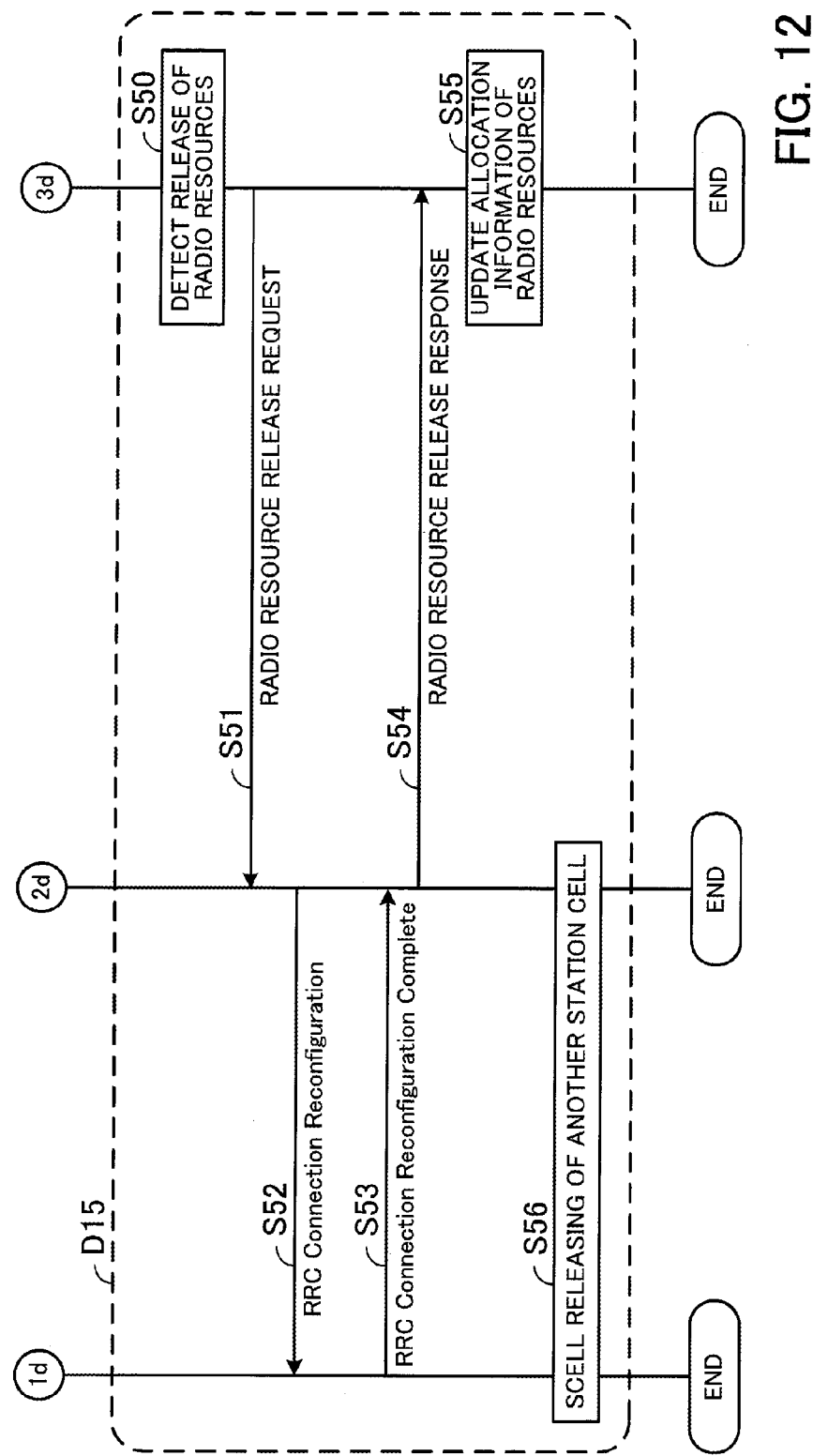
FIG. 12 is a sequence diagram of the radio communication system.

A dotted line frame D15 indicated in FIG. 12 illustrates release processing of radio resources of the Scell.

[Step S50] The eNB 32 detects release of radio resources which have been allocated to the UE 34. For example, when radio resources allocated to the UE 34 are allocated to a UE having higher priority than the UE 34, the eNB 32 detects the release of the radio resources.

[Step S51] The eNB 32 transmits a radio resource release request to the eNB 31.

[Step S52] The eNB 31 makes an RRC connection reconfiguration request to the UE 34 in order to establish a call with the UE 34.

[Step S53] The UE 34 returns a response to the RRC connection reconfiguration request at Step S52, to the eNB 31.

[Step S54] The eNB 31 transmits a radio resource release response to the eNB 32.

[Step S55] The eNB 32 changes radio resource allocation information of the UE 34. For example, the eNB 32 updates the radio resource allocation information so as to indicate that radio resources of the frequency band f3 which have been allocated to the UE 34 have been released.

[Step S56] The eNB 31 notifies the UE 34 that the Scell of another station has been released. For example, the eNB 31 notifies the UE 34 that the cell 43 of the Scell of the eNB 32 has been released.

Besides, in the above-mentioned sequence, although a case where the eNBs 31 and 32 exchange data by an X2 interface based on X2AP (X2 Application Protocol) is described, the exchange of data may be performed via an S1 interface based on S1AP (S1 Application Protocol). That is, the eNBs 31 and 32 may exchange data via the MME 33.

Figure 13:
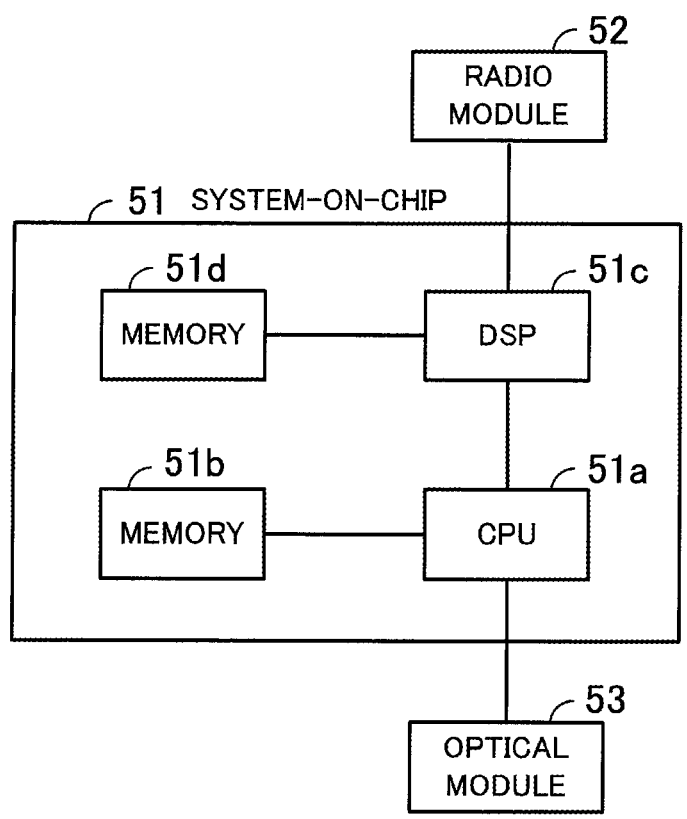
FIG. 13 illustrates a hardware configuration example of the eNB.

FIG. 13 illustrates a hardware configuration example of an eNB. As illustrated in FIG. 13, the eNB 31 has a system-on-chip 51, a radio module 52 and an optical module 53.

The system-on-chip 51 has a CPU (Central Processing Unit) 51*a*, memories 51*b* and 51*d*, and a DSP (Digital Signal Processing) 51*c*. As for the system-on-chip 51, the whole chip is controlled by the CPU 51*a*. To the CPU 51*a*, the memory 51*b* and the DSP 51*c* are connected via a bus.

In the memory 51*b*, stored are a program of an OS (Operating System) and an application program which are executed by the CPU 51*a*. In addition, in the memory 51*b*, various data needed for processing by the CPU 51*a* are stored.

In the memory 51*d*, stored are a program of the OS and an application program which are executed by the DSP 51*c*. In addition, in the memory 51*d*, various data needed for processing by the DSP 51*c* are stored. In place of the DSP 51*c*, an FPGA (Field Programmable Gate Array) may be mounted.

The radio module 52 performs radio communication with UEs. For example, the radio module 52 up-converts a frequency of a signal to be transmitted to UEs, and/or down-converts a frequency of a signal received from UEs.

The optical module 53 performs communication with another eNB 32 by using light. In addition, the optical module 53 performs communication with the MME 33 by using light. Note that the eNB 32 has the same hardware as FIG. 13.

As for the transmitting unit 1*a* and transfer unit 1*b* of FIG. 1, functions thereof are realized by the DSP 51*c* illustrated in FIG. 13, for example. As for the receiving unit 2*a* and transmitting unit 2*b* of FIG. 1, functions thereof are realized by the DSP 51*c* illustrated in FIG. 13, for example. Processing of a flow chart of FIG. 7 is performed by the DSP 51*c*.

Figure 14:
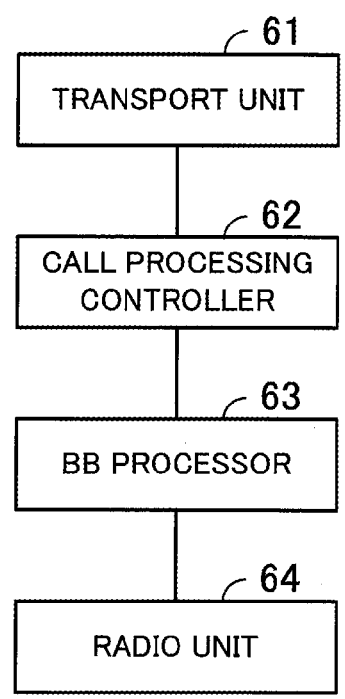
FIG. 14 illustrates a functional block of the eNB.

FIG. 14 illustrates a functional block of an eNB. As illustrated in FIG. 14, the eNB 31 has a transport unit 61, a call processing controller 62, a BB (Base Band) processor 63 and a radio unit 64. As for the transport unit 61 illustrated in FIG. 14, a function thereof is realized by the optical module 53 illustrated in FIG. 13, for example. As for the call processing controller 62 and BB processor 63, functions thereof are realized by the DSP 51*c*, for example. As for the radio unit 64, a function thereof is realized by the radio module 52, for example.

The transport unit 61 performs communication with the eNB 32 or the MME 33 based on an SCTP (Stream Control Transmission Protocol) and lower layer protocols, for example. The call processing controller 62 performs call processing or the like of the UE 34, for example. The BB processor 63 performs baseband processing of data which are communicated with the UE 34. The radio unit 64 performs radio communication with the UE 34. Note that the eNB 32 has the same functional block as FIG. 14. Processes at Steps S1, S2 and S8 of FIG. 7 are performed by the call processing controller 62 and BB processor 63. Processes at Steps S3 to S7 are performed by the call processing controller 62.

Hereinafter, sequences which have been described in FIGS. 8 to 12 will be described in detail. First, CA start processing will be described.

Figure 15:
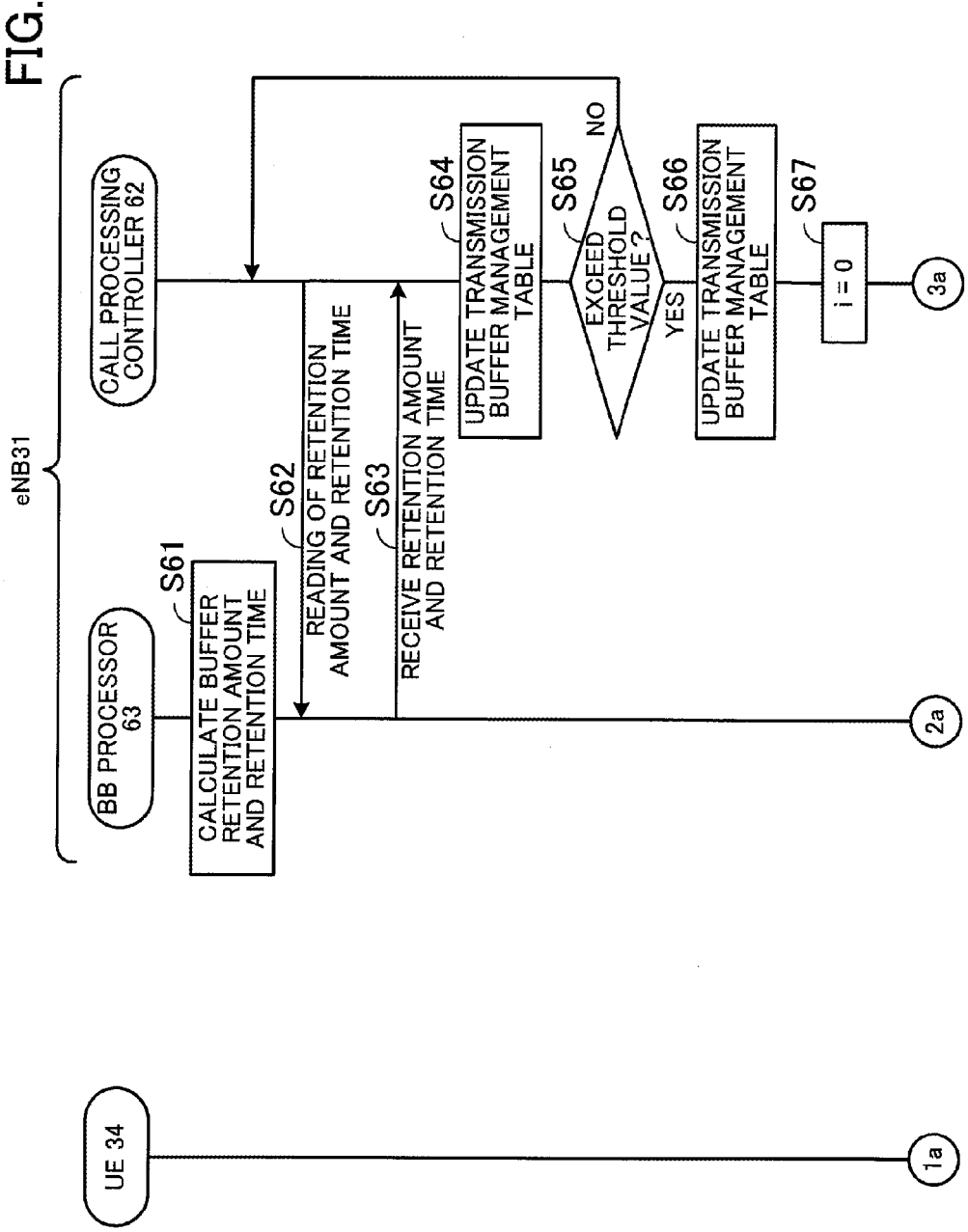
FIG. 15 is a sequence diagram illustrating a CA start process.
Figure 16:
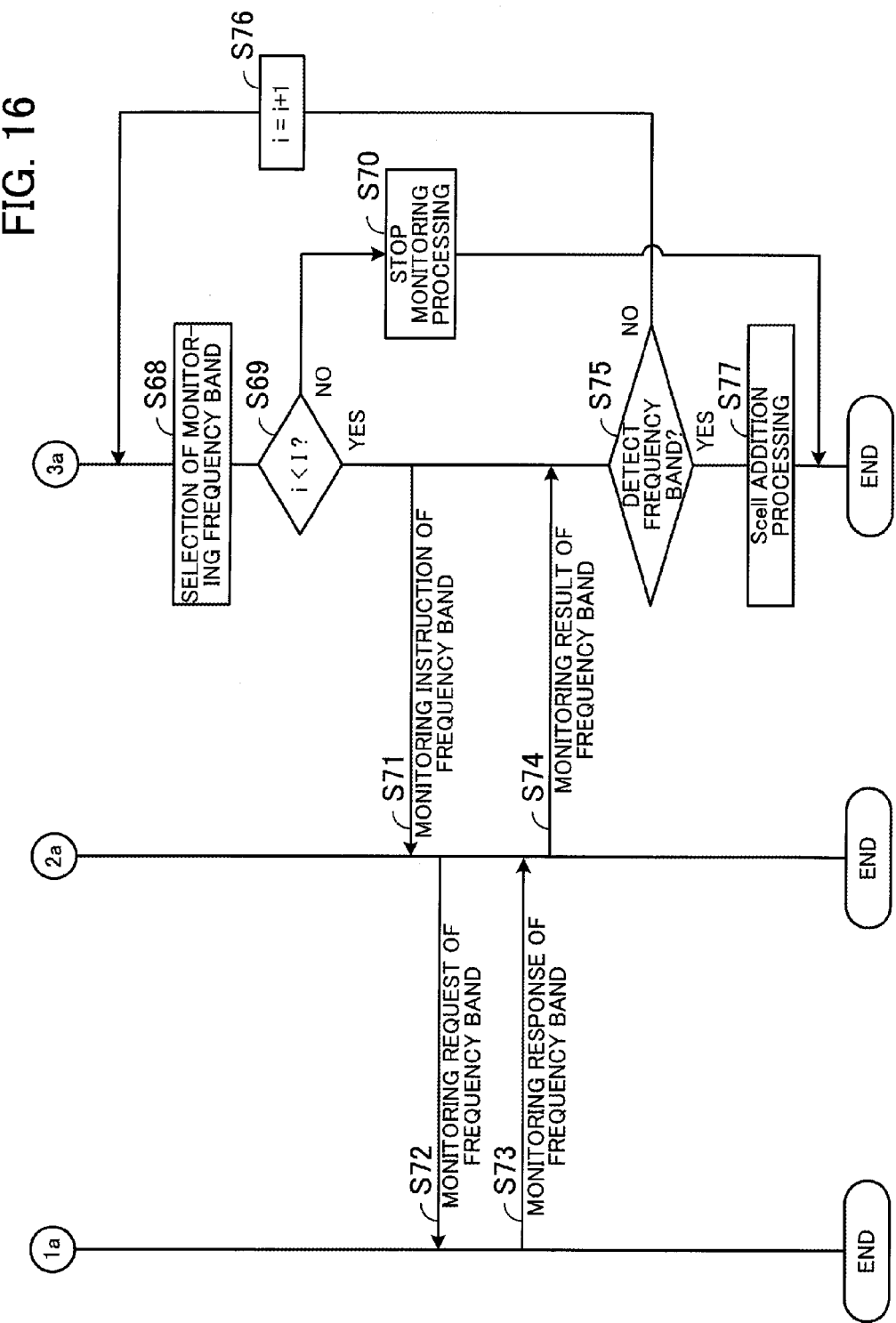
FIG. 16 is a sequence diagram illustrating the CA start process.

FIG. 15 and FIG. 16 are sequence diagrams illustrating the CA start processing. The sequence diagrams of FIG. 15 and FIG. 16 correspond to the process at Step S14 of FIG. 8, for example.

[Step S61] The BB processor 63 of the eNB 31 calculates a retention amount and retention time of a buffer for temporarily storing data to be transmitted to the UE 34. That is, the BB processor 63 calculates the retention amount and retention time of non-transmitted data of the UE 34. The BB processor 63 stores the calculated retention amount and retention time in a buffer information management table. The buffer information management table is formed in the memory 51*d* illustrated in FIG. 13, for example.

[Step S62] The call processing controller 62 reads the retention amount and retention time of the UE 34 which are stored in the buffer information management table.

[Step S63] The call processing controller 62 receives the retention amount and retention time of the UE 34 which are read from the buffer information management table.

[Step S64] The call processing controller 62 stores and updates the received retention amount and retention time of the UE 34 in a transmission buffer management table. The transmission buffer management table is formed in the memory 51*d* illustrated in FIG. 13, for example.

[Step S65] The call processing controller 62 determines whether the retention amount and retention time exceed a threshold value. The call processing controller 62 proceeds to Step S66, when the retention amount and retention time exceed the prescribed threshold value. The call processing controller 62 proceeds to Step S62, when the retention amount and retention time are no more than the prescribed threshold value.

[Step S66] The call processing controller 62 updates the priority of the UE 34 whose retention amount and retention time are stored in the transmission buffer management table.

FIG. 17 illustrates the transmission buffer management table. As illustrated in FIG. 17, the transmission buffer management table has columns of priority order, QCI (Qos Class Identifier), retention amount threshold value, non-transmitted data retention amount, retention time threshold value, and non-transmission data retention time.

In the column of priority order, a UE performing the CA is stored. In an example of FIG. 17, the higher in the column the UE is stored, the higher is the priority order with which to perform the CA.

In the column of QCI, QCI of a UE is stored. The QCI of the UE is included in E-RAB Level QoS Parameters of a message notified from the MME 33 at the time of configuring a bearer.

In the column of retention amount threshold value, a threshold value of a buffer retention amount is stored. The retention amount threshold value is determined based on the QCI, for example. For example, as illustrated in FIG. 17, when the QCI is '2', the retention amount threshold value is '50'. Note that the retention amount threshold value may be changed optionally. For example, when the QCI is '2', the retention amount threshold value may be changed to '60'.

In the column of retention time threshold value, a threshold value of the retention time of the non-transmitted data stored in the buffer is stored. The retention time threshold value is determined based on the QCI, for example. For example, when the QCI is '2' as illustrated in FIG. 17, the retention time threshold value is '150'. Note that the retention time threshold value may be changed optionally. For example, when the QCI is '2', the retention time threshold value may be changed to '160'.

The call processing controller 62, based on a percentage of the non-transmitted data retention amount to the retention amount threshold value, and a percentage of the non-transmitted data retention time to the retention time threshold value, determines the priority order of UEs performing the CA, for example. For example, the call processing controller 62 adds the percentage of the non-transmitted data retention amount to the retention amount threshold value to the percentage of the non-transmitted data retention time to the retention time threshold value, and the higher added value the UE has, the higher the priority order is raised. Note that the call processing controller 62 determines the priority order based on the QCI, when the UE having the same percentage exists in plurality.

Note that determination whether the threshold value is exceeded at Step S65 mentioned above is performed based on values of the column of the retention amount threshold value and retention time threshold value.

Description will be returned to the description of FIG. 15.

[Step S67] The call processing controller 62 substitutes zero for a variable i.

[Step S68] The call processing controller 62 refers to the transmission buffer management table, and selects UEs having the retention amount and retention time exceeding the retention amount threshold value and retention time threshold value. At this time, the call processing controller 62 selects UEs in descending order of the priority order.

The call processing controller 62 selects a frequency band to be monitored by the selected UE. For example, the call processing controller 62 is assumed to have selected the UE 34. The call processing controller selects, as monitoring frequency bands, frequency bands which coincide between frequency bands of the selected UE 34 in which radio communication is able to be performed and frequency bands of cells of the eNB 31. In addition, the call processing controller 62 selects, as monitoring frequency bands, frequency bands which coincide between frequency bands of the selected UE 34 in which radio communication is able to be performed and frequency bands of cells of another station (eNB 32).

FIG. 18 illustrates selection of monitoring frequency bands. In FIG. 18, a monitoring frequency band selection table is illustrated. The monitoring frequency band selection table is formed in the memory 51d illustrated in FIG. 13, for example. As illustrated in FIG. 18, the monitoring frequency band selection table has columns of own station frequency band information, another station frequency band information, and UE frequency band information.

In the column of the own station frequency band information, frequency bands of cells which the eNB 31 forms are stored. In the column of another station frequency band information, frequency band information of cells which the eNB 32 forms is stored. That is, in each column of the own station frequency band information and another station frequency band information, frequency bands where each of the eNBs 31 and 32 may perform communication are stored, respectively. For example, in accordance with an example of FIG. 6, in columns of the own station frequency band information and another station frequency band information of FIG. 18, information of frequency bands as illustrated in FIG. 18 is stored.

In the column of the UE frequency band information, stored is frequency band information of UEs served by the eNB 31, in which radio communication may be performed. In accordance with an example of FIG. 6, information as illustrated in FIG. 18 is stored in the column of the UE frequency band information of FIG. 18.

Frequency bands of the UE 34 in which radio communication may be performed are able to be acquired by processing at Step S11 illustrated in FIG. 8, for example. The call processing controller 62, at processing of Step S11, receives capability information of the UE 34 from the UE 34, and acquires frequency bands of the UE 34 in which radio communication may be performed, from the received capability information. Then, the call processing controller 62 stores the acquired frequency bands in the monitoring frequency band selection table.

The call processing controller 62, as described above, selects, as monitoring frequency bands, frequency bands which coincide between frequency bands of the UE 34 in which radio communication may be performed and frequency bands of cells of the eNB 31. In addition, the call processing controller 62 selects, as monitoring frequency bands, frequency bands which coincide between frequency bands of the UE 34 in which radio communication may be performed and frequency bands of cells of another station. For example, in a case of FIG. 18, the call processing controller 62 selects frequency bands f2 and f3 as monitoring frequency bands. Note that the frequency band f1 is not selected since it is used as the Pcell. That is, the call processing controller 62 selects frequency bands in which the UE 34 may perform radio communication with the eNBs 31 and 32.

Besides, the call processing controller 62, when selecting monitoring frequency bands, may select frequency bands which are close to the frequency band of the Pcell in the order of proximity as monitoring frequency bands. For example, in FIG. 18, frequency bands of the UE 34 in which radio communication may be performed are assumed to be f1 to f4. In addition, it is assumed that there is a relation of f1<f2<f3<f4. In this case, the call processing controller 62 selects monitoring frequency bands in order of frequency bands f2, f3 and f4 from the frequency band close to the Pcell. Thereby, the UE 34 is able to process integrally a plurality of frequency bands which are adjacent, and reduce a load thereof, for example.

Description will be returned to the description of FIG. 16.

[Step S69] The call processing controller 62 determines whether or not a variable i is smaller than a variable I. The variable I is the number of frequency bands of the UE 34 in which radio communication may be performed. For example, in the case of an example of the UE 34 of FIG. 18, I is '3'.

[Step S70] The call processing controller 62 stops monitoring processing of the UE 34, when the variable i is no less than the variable I.

[Step S71] The call processing controller 62 performs monitoring instruction of frequency bands selected at Step S68 to the BB processor 63.

[Step S72] The BB processor 63 makes a request for monitoring frequency bands selected at Step S68, via the radio unit 64.

[Step S73] The BB processor 63 receives a monitoring response (result) of frequency bands from the UE 34, via the radio unit 64.

[Step S74] The call processing controller 62 receives monitoring results of frequency bands from the BB processor 63.

[Step S75] The call processing controller 62 determines whether the UE 34 has detected frequency bands specified by the monitoring instruction, based on the monitoring results received from the BB processor 63. The call processing controller 62, when determining that the UE 34 has detected frequency bands specified by the monitoring instruction, determines that 'the UE 34 may perform radio communication with the frequency bands specified by the monitoring instruction', and proceeds to Step S77. The call processing controller 62, when determining that the UE 34 has not detected frequency bands specified by the monitoring instruction, proceeds to Step S76.

Note that the call processing controller 62 detects the frequency bands f2 and f3 in the case of examples of FIGS. 6 and 18.

[Step S76] The call processing controller 62 adds one to the variable i.

[Step S77] The call processing controller 62 performs additional processing of the Scell.

Note that the monitoring request at Step S72 corresponds to the processing at Step S15 of FIG. 8, for example. The monitoring response at Step S73 corresponds to processing at Step S17 of FIG. 8, for example. In addition, the frequency band detection and Scell additional processing at Steps S75 and S77 correspond to processes of the dotted line frame D11 of FIG. 8 and the dotted line frame D12 of FIG. 9, for example.

A radio resource allocation request process of the Scell will be described.

Figure 19:
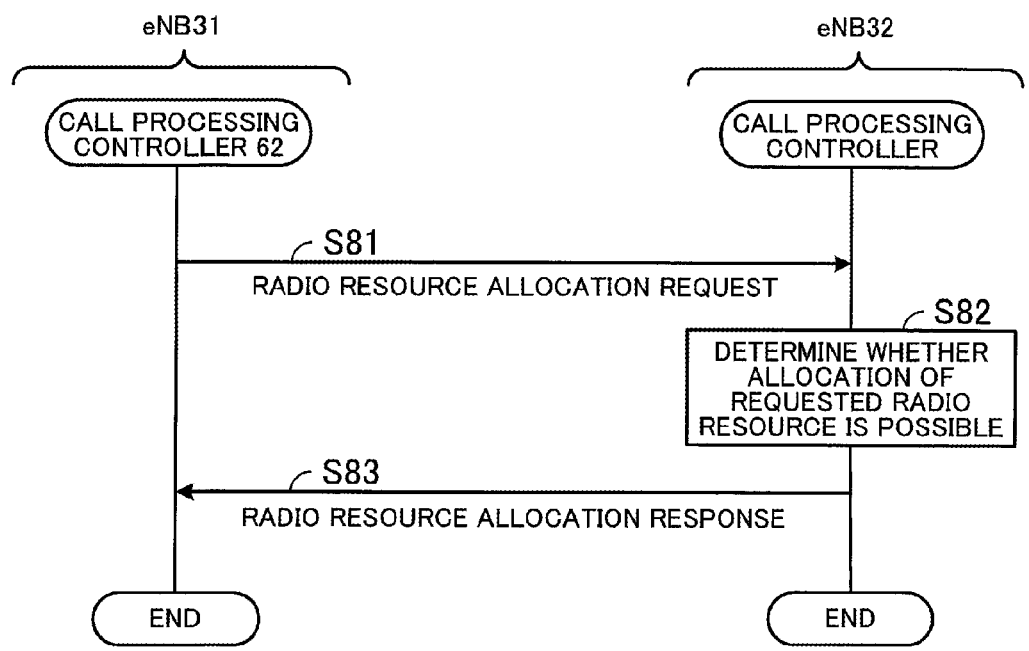
FIG. 19 is a sequence diagram illustrating a radio resource allocation request process of a Scell.

FIG. 19 is a sequence diagram illustrating the radio resource allocation request process of the Scell. The sequence diagram of FIG. 19 corresponds to processes at Steps S23 to S25 of FIG. 9, for example.

[Step S81] The call processing controller 62 of the eNB 31 makes a radio resource allocation request to the call processing controller of the eNB 32 via the transport unit 61. At this time, the call processing controller 62 transmits the allocation information of radio resources expected to the Scell of the eNB 32, to the eNB 32.

For example, the call processing controller 62 transmits RBs (Resource Blocks) which are desired to be allocated to the UE 34, and information of a period thereof, to the eNB 32.

In addition, the call processing controller 62 transmits UE information of the UE 34 attempting to perform CA, to the eNB 32. The UE information includes the QCI, the retention amount threshold value, the non-transmitted data retention amount, the retention time threshold value, and the non-transmitted data retention time which are stored in the transmission buffer management table illustrated in FIG. 17, for example.

In addition, the call processing controller 62 transmits an identifier (UE-ID) of the UE 34 attempting to perform the CA, to the eNB 32.

In addition, the call processing controller 62 transmits, to the eNB 32, the Cell-ID by which the UE 34 may perform radio communication with the eNB 32 of another station. For example, this Cell-ID is the ID of the cell 43 (frequency band f3) of the eNB 32 detected at Step S75 of FIG. 16.

[Step S82] The call processing controller of the eNB 32 determines whether or not allocation of radio resources is possible, based on the allocation information of radio resources which is received from the eNB 31. For example, the call processing controller determines whether or not allocation of radio resources of the UE 34 is possible, depending on whether or not there exists a vacant space in RBs of the frequency band f3 of the eNB 32.

At this time, the call processing controller of the eNB 32 determines whether or not allocation of radio resources is possible, based on the UE information of the UE 34 received from the eNB 31, in consideration of priority order between UEs served by the eNB 32 and the UE 34. For example, the call processing controller determines that allocation of radio resources is not possible, even when there exists a vacant space in the frequency band f3 of the eNB 32, if the UE 34 has the lower priority order than other UEs.

[Step S83] The call processing controller of the eNB 32 transmits, to the eNB 31, a response to whether or not allocation of radio resources is possible, via the transport unit. The call processing controller of the eNB 32, when transmitting the response to whether or not allocation of radio resources is possible, transmits the identifier of the UE 34 for which determination of whether or not allocation of radio resources is possible has been performed.

Note that the call processing controller 62 of the eNB 31 allocates radio resources of the eNB 32 to the UE 34, based on allocation information of radio resources expected to the eNB 32. The information of radio resources of the eNB 32 allocated to the UE 34 is transmitted to the eNB 32 along with the data transfer of the UE 34, by the BB processor 63 as mentioned later.

In addition, the allocation information of radio resources expected to the Scell of the eNB 32 which has been described at Step S81 is changed due to detection of change of radio resources of the eNB 32. In addition, the allocation information of radio resources expected to the Scell of the eNB 32 which has been described at Step S81 is released due to detection of release of radio resources of the eNB 32.

In addition, in the above-mentioned sequences, although a case where the eNBs 31 and 32 exchange data with the X2 interface based on the X2AP has been described, the exchange of data may be performed via the S1 interface based on the S1AP. That is, the eNBs 31 and 32 may exchange data via the MME 33.

FIG. 20 illustrates determination of priority order in another station. A transmission buffer management table 71 indicated in FIG. 20 illustrates the transmission buffer management table stored in the memory 51*d* of the eNB 31. A transmission buffer management table 72 illustrates the transmission buffer management table stored in the memory of the eNB 32 of another station.

The UE information of the UE 34 is transmitted to the eNB 32 as described at Step S81 of FIG. 19. The UE information transmitted to the eNB 32 is stored in the transmission buffer management table 72 of the eNB 32. For example, as indicated by an arrow A11 of FIG. 20, the UE information of the UE 34 is stored in the transmission buffer management table 72 of the eNB 32. Note that UE#2 of FIG. 20 corresponds to the UE 34.

The call processing controller of the eNB 32 determines priority order of the UE 34, based on the transmission buffer management table 72. In examples in FIG. 20, the priority order of the UE 34 (UE#2) is set to be the highest. Therefore, the call processing controller of the eNB 32, when there exists RB not used in the frequency band f3, returns the response indicating that allocation of radio resources is possible, to the eNB 31, for example.

A processing delay measuring process of data transfer will be described.

FIG. 21 is a sequence diagram illustrating the processing delay measuring process of data transfer. The sequence diagram of FIG. 21 corresponds to processes of Steps S27 to S29 of FIG. 9, for example.

[Step S91] The BB processor 63 of the eNB 31 provides a message of GTP-u (General packet radio service Tunneling Protocol for user plane) with a clock time T1 at the time of transmission.

[Step S92] The BB processor 63 transmits the message of GTP-u provided with the clock time T1 to the eNB 32, via the transport unit 61. At this time, the BB processor 63 provides a TE-ID (Tunnel Endpoint IDentifier) for the eNB 32 so that the message may be received by the eNB 32. Note that the TE-ID of the eNB 32 is notified from the eNB 32 in the processing at Step S83 of FIG. 19, for example.

[Step S93] The BB processor of the eNB 32 provides the message of GTP-u with a clock time T2 at the time of transmission of the message.

[Step S94] The BB processor of the eNB 32 transmits the message of GTP-u provided with the clock time T2 to the eNB 31, via the transport unit. At this time, the BB processor provides the clock time T1 included in the message received from the eNB 31. In addition, the BB processor provides the TE-ID for the eNB 31 so that the message may be received by the eNB 31. Note that the TE-ID of the eNB 31 is notified from the eNB 31 in the processing at Step S81 of FIG. 19, for example.

[Step S95] The BB processor 63 of the eNB 31 calculates processing delay time Δt. That is, the BB processor 63 calculates a time needed for data transfer from the eNB 31 to the eNB 32. The BB processor 63 calculates Δt with the following formula (1), for example.

$$\Delta t = T2 - T1 \qquad (1)$$

Note that Δt calculated by the BB processor 63 is notified to the call processing controller 62. The call processing controller 62 performs scheduling of the UE 34, based on Δt notified from the BB processor 63. For example, the call processing controller 62 performs, based on Δt, scheduling of an allocation of radio resources and a transmission timing for the UE 34.

The above-mentioned sequences illustrate an operation in case where the X2 interface is established between the eNBs 31 and 32. Hereinafter, a case where the X2 interface is not established will be described.

Figure 22:
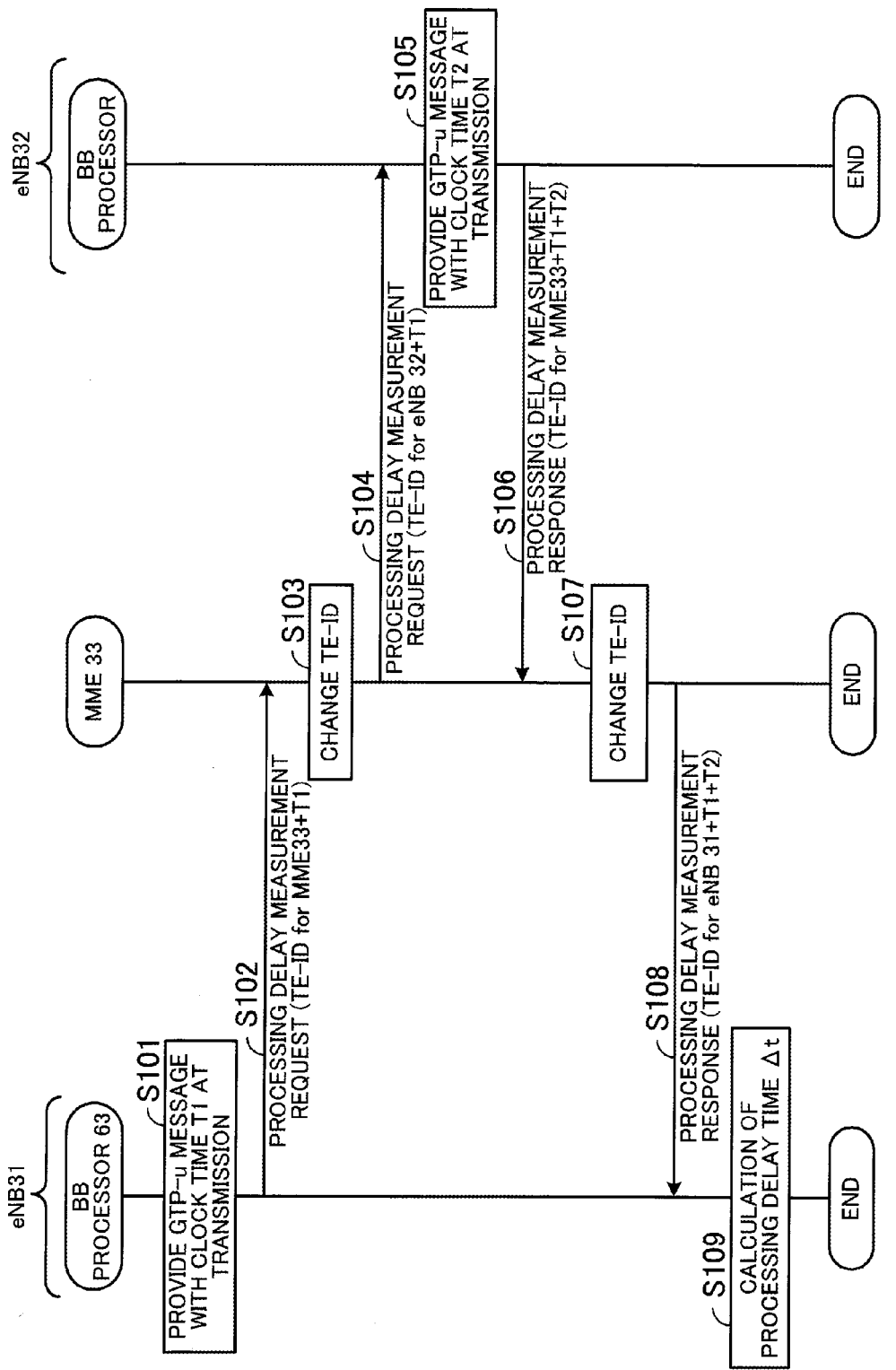
FIG. 22 is another sequence diagram illustrating the processing delay measuring process of the data transfer.

FIG. 22 is another sequence diagram illustrating a processing delay measuring process of data transfer. The sequence diagram of FIG. 22 corresponds to processes at Steps S27 to S29 of FIG. 9, for example.

[Step S101] The BB processor 63 of the eNB 31 provides a message of GTP-u with a clock time T1 at the time of transmission.

[Step S102] The BB processor 63 transmits the message of GTP-u provided with the clock time T1 to the eNB 32, via the transport unit 61. At this time, the BB processor 63 provides a TE-ID for the MME 33, so that the message may be received by the MME 33.

[Step S103] The MME 33 changes the TE-ID of the message received from the eNB 31 to the TE-ID for the eNB 32.

[Step S104] The MME 33 transmits the message with the TE-ID changed, to the eNB 32.

[Step S105] The BB processor of the eNB 32 provides a message of GTP-u with the clock time T2 at the time of transmission of the message.

[Step S106] The BB processor of the eNB 32 transmits the message of GTP-u provided with the clock time T2 to the MME 33, via the transport unit. At this time, the BB processor provides the clock time T1 included in the message received from the eNB 31. In addition, the BB processor provides the TE-ID for MME 33, so that the message may be received by the MME 33.

[Step S107] The MME 33 changes the TE-ID of the message received from the eNB 32 to the TE-ID for the eNB 31.

[Step S108] The MME 33 transmits the message with the TE-ID changed to the eNB 31.

[Step S109] The BB processor 63 of the eNB 31 calculates the processing delay time Δt. For example, the BB processor 63 calculates Δt with the above-mentioned formula (1).

In this way, even when the X2 interface is not established, the processing delay time due to the S1 interface is able to be measured by the above-mentioned sequences.

CA processing will be described.

Figure 23:
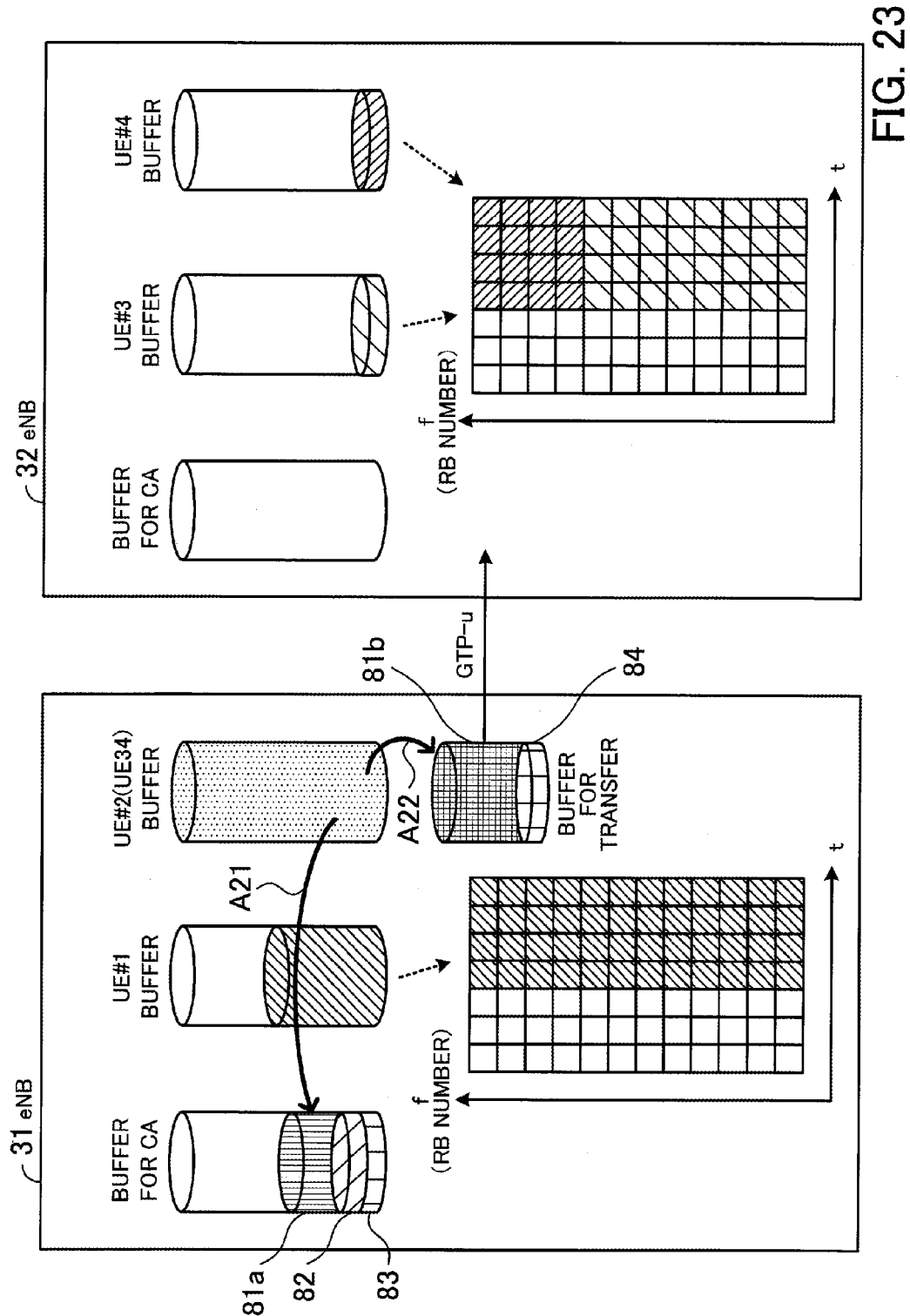
FIG. 23 is a part 1 of figures illustrating CA processing.

FIG. 23 is a part 1 of figures illustrating the CA processing. In FIG. 23, illustrated are buffers which the eNB 31 has at a certain clock time Tx, and radio resource allocation of the eNB 31 (horizontal axis t, vertical axis f (number of RBs)). A UE#2 buffer of the eNB 31 illustrated in FIG. 23 indicates a buffer in which transmission data of the UE 34 illustrated in FIG. 6 is stored temporarily, for example. A UE#1 buffer indicates a buffer in which transmission data of a UE which is not illustrated in FIG. 6 is stored temporarily, for example. A buffer for CA indicates a buffer in which data to be subjected to CA is stored temporarily. A buffer for transfer indicates a buffer in which data to be transferred to the eNB 32 is stored temporarily.

In addition, in FIG. 23, buffers which the eNB has and radio resource allocation of the eNB 32 (horizontal axis t, vertical axis f (number of RBs)) are illustrated. Buffers UE#3 and UE#4 of the eNB 32 illustrated in FIG. 23 indicate buffers in which transmission data of UEs which are not illustrated in FIG. 6 are stored temporarily, for example. The buffer for CA indicates a buffer in which data to be subjected to CA is stored temporarily. A flow of processing illustrated in FIG. 23 corresponds to processes at Steps S33 and S34 of FIG. 9, for example.

To data to be transmitted to a UE, usually, radio resources are allocated as soon as the scheduling is determined. For example, as illustrated in the UE#1 buffer of FIG. 23 and the radio resource allocation indicated in the lower part thereof, to data to be transmitted to the UE#1, radio resources are allocated as soon as the scheduling is determined.

On the other hand, data with a retention amount and retention time exceeding a prescribed threshold value are not allocated immediately to radio resources, even when the scheduling is determined. For example, as for data to be transmitted to the UE 34 (UE#2 ), the retention amount and retention time are assumed to have exceeded the prescribed threshold value. In this case, the data to be transmitted to the UE#2, as indicated by arrows A21 and A22, are queued in the buffer for CA and the buffer for transfer.

The data 81a and 81b illustrate transmission data of the UE 34 which are queued.

Data 82 indicate scheduling information of the data 81a and 81b. The data 82 indicate scheduling of the PDSCH of the Pcell of the eNB 31 and scheduling of the PDSCH of the Scells of the eNBs 31 and 32, for example.

Data 83 are information which indicates at which timing the data 81a and 82 are to be transmitted to the UE 34. That is, the data 83 indicate a time for queuing of the data 81a and 82 stored in the buffer for CA. The information of the data 83 is an SFN (System Frame Number), a subframe number and RB assignment information with which the data 81a and 82 are transmitted, for example. The SFN and the subframe number are determined based on ΔT calculated with the formula (1). That is, the eNB 31, after a prescribed time of ΔT or ΔT+α, allocates the data 81a and 82 to radio resources, and transmits them to the UE 34.

Data 84 are information which indicates at which timing the data 81b are to be transmitted to the UE 34. The data 84 indicate the same contents as the data 83. That is, the data 81*b* are transmitted from the eNB 32 to the UE 34 at the same timing as the data 81*a*.

Note that the data 81*b* and 84, as soon as queued in the buffer for transfer, are transferred to the eNB 32 with the message of GTP-u. A time needed for transferring the data 81*b* and 84 is Δt.

Figure 24:
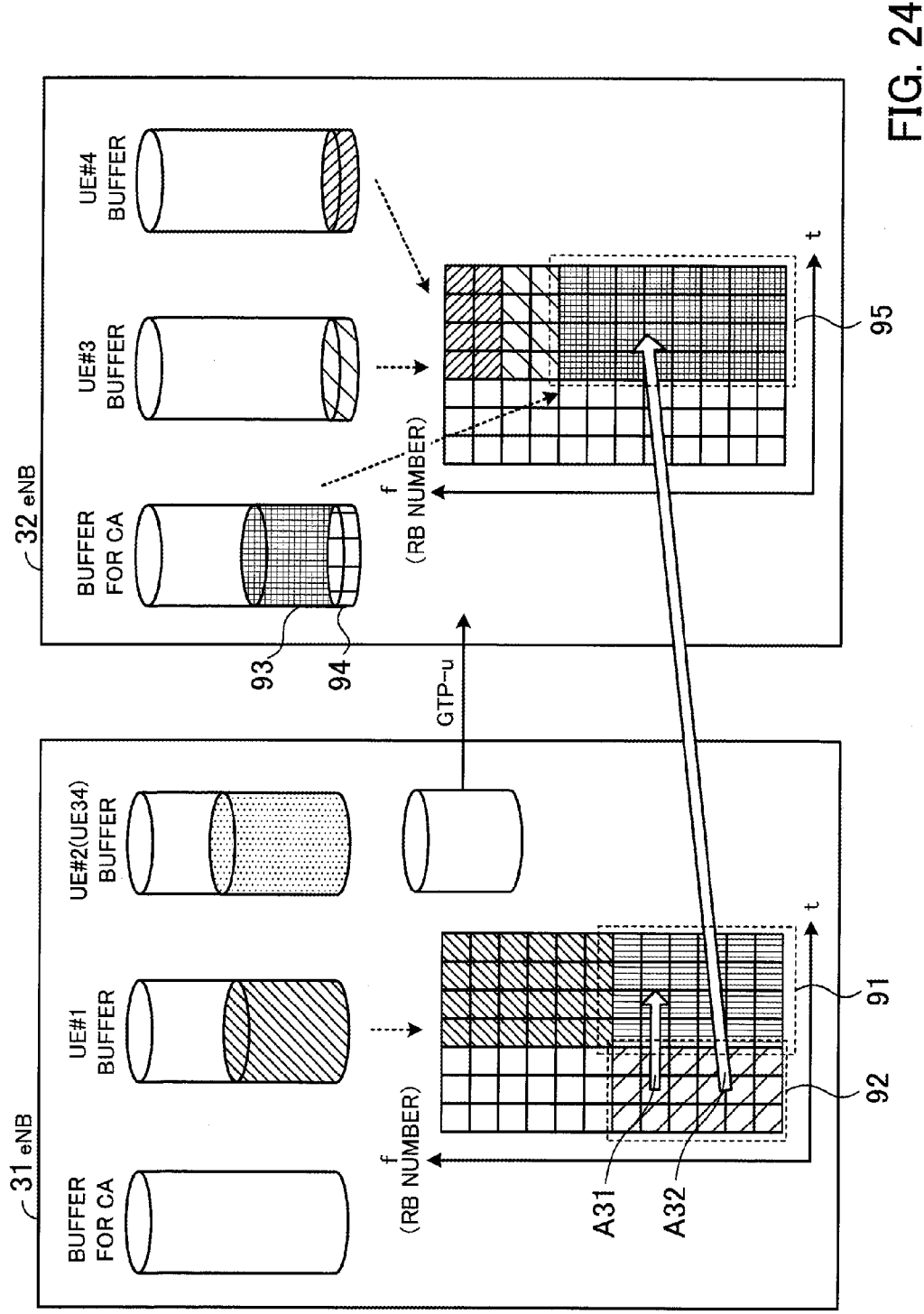
FIG. 24 is a part 2 of figures illustrating the CA processing.

FIG. 24 is a part 2 of figures illustrating CA processing. FIG. 24 illustrates a situation after a prescribed time from FIG. 23 (after ΔT or ΔT+α).

A dotted line frame 91 indicated in FIG. 24 indicates the data 81*a* described in FIG. 23. That is, the data 81*a* queued in the buffer for CA are allocated to radio resources after a prescribed time based on the data 83, and are transmitted to the UE 34.

A dotted line frame 92 indicates the data 82 described in FIG. 23. That is, the scheduling information which has been queued in the buffer for CA and is to be transmitted to the UE 34 by PDCCH is allocated to radio resources after a prescribed time based on the data 83, and is transmitted to the UE 34.

Data 93 and 94 are the data 81*b* and 84 described in FIG. 23. That is, the data 93 and 94 are data transferred from the eNB 31. The data 93 are allocated to radio resources after a prescribed time, based on the data 94 which indicate the same contents as the data 83, and are transmitted to the UE 34. Note that a dotted line frame 95 indicates the data 93 allocated to radio resources.

That is, the data 81*a*, 81*b* and 82 described in FIG. 23 are transmitted to the UE 34 in consideration of delay time of the data 81*b* transferred to the eNB 32.

The dotted line frame 92 indicates the scheduling information to be transmitted by the PDCCH to the UE 34. Therefore, the data indicated in dotted line frames 91 and 95 have been allocated to RBs in accordance with the scheduling information of the dotted line frame 92, as indicated by arrows A31 and A32.

Scheduling of data to be transmitted to a UE is performed by the call processing controller 62. For example, the call processing controller 62 carries out scheduling of allocation of RBs and the transmission timing for the UE 34.

The BB processor 63 allocates the data stored in buffers illustrated in FIG. 23 and FIG. 24 to radio resources, based on the scheduling of the call processing controller 62, and transmits the data to the UE, for example. In addition, the BB processor 63 transfers a part of data to be transmitted to the UE, as illustrated in FIG. 23, to the eNB 32 of another station.

The BB processor of the eNB 32 receives the data transferred from the eNB 32. The BB processor of the eNB 32 allocates the received data to radio resources, based on the SFN, subframe number and RB assignment information which are included in the received data, and transmits the data to the UE 34.

The call processing controller of the eNB 32 receives the allocation information of radio resources expected to the Scell of the eNB 32, from the eNB 31 in advance (for example, Step S81 of FIG. 19), and has secured radio resources to be allocated to the UE 34. Therefore, the BB processor of the eNB 32 is able to allocate radio resources to the UE 34, based on the SFN, frame number and RB assignment information which are received from the eNB 31.

The call processing controller 62 and BB processor 63 correspond to the transmitting unit 1*a* of FIG. 1, for example. In addition, the call processing controller 62 and BB processor 63 correspond to the transfer unit 1*b* of FIG. 1, for example. The BB processor of the eNB 32 corresponds to the receiving unit 2*a* and transmitting unit 2*b* of FIG. 1, for example.

FIG. 25 illustrates a data format example of data to be transferred to an eNB of another station. In FIG. 25, Extension Header of a GTP-u message is illustrated.

In Next Extension Header Type of the GTP-u message, '0' is stored usually. When the Extension Header is used, values other than '0' are stored in the column of Next Extension Header Type. For example, '0x01' is stored as illustrated in FIG. 25. In the second octet of the Extension Header, Extension Header Length is stored.

The SFN is stored in the third octet to the fourth octet of the Extension Header, for example, as illustrated in FIG. 25. The subframe number is stored in the fourth octet of the Extension Header. The RB assignment information is stored in the fifth octet to the n-1-th octet of the Extension Header.

Note that in a domain following the Extension Header of the GTP-u message, a user message is stored. That is, in the domain following the Extension Header, data to be transferred to the eNB 32 are stored.

FIG. 26 illustrates a data flow in a downlink layer. In FIG. 26, a layer 101 of the eNB 31, a layer 102 of the eNB 32 and a layer 103 of the UE 34 are illustrated. As illustrated in FIG. 26, the layer 101 of the eNB 31 has layers of GTP-u, PDCP (Packet Data Convergence Protocol), RLC (Radio Link Control), MAC (Medium Access Control) and L1 (Layer 1). The layer 102 of the eNB 32 has layers of GTP-u, PDCP, RLC, MAC and L1. The layer 103 of the UE 34 has layers of PDCP, RLC, MAC and L1.

A dotted line arrow A41 illustrated in FIG. 26 indicates a data flow of the PDCCH. Data of the PDCCH are transmitted to the UE 34 via the Pcell of the eNB 31, as indicated by the dotted line arrow A41.

An arrow A42 indicates a data flow of the PDSCH via the Pcell. Data of the PDSCH, as indicated by the arrow A42, are transmitted to the UE 34 via the Pcell of the eNB 31.

An arrow A43 indicates a data flow of the PDSCH via the Scell. The data of the PDSCH are transmitted to the UE 34 via the Scell of the eNB 31, and the Scell of the eNB 32 of another station, as indicated by the arrow A43. Data transferred to the eNB from the eNB 31 is transferred to the GTP-u layer from the MAC layer in the eNB 31, and is transferred to the GTP-u layer of the eNB 32.

A case where an ending trigger of the CA between the eNBs 31 and 32 is detected in the Pcell will be described. The following processing corresponds to the processing in the dotted line frame D13 of FIG. 10, for example.

The call processing controller 62 of the eNB 31 makes a request for stopping the CA to the BB processor 63, when the retention amount and retention time of data to be transmitted to the UE 34 have become no more than a prescribed threshold value. The BB processor 63 stops data transmission by the CA, upon receiving the request for stopping the CA from the call processing controller 62. In addition, the BB processor 63 stops data transfer to another eNB 32.

Similarly, the call processing controller 62 makes a request for stopping the CA also to the BB processor of the eNB 32. The BB processor of the eNB 32 stops the CA upon receiving the request for stopping the CA from the call processing controller 62, and releases the Scell.

A case where there is a radio resource change request of the CA in the Scell of another station will be described. The following processing corresponds to the processing in the dotted line frame D14 of FIG. 11, for example.

The call processing controller of the eNB 32 detects change of radio resources which have been allocated to the UE 34. For example, when a part of the radio resources allocated to the UE 34 are allocated to a UE having higher priority than the UE 34, the call processing controller of the eNB 32 detects the change of the radio resources.

The call processing controller of the eNB 32 makes a radio resource change request to the call processing controller 62 of the eNB 31. At this time, the call processing controller of the eNB 32 notifies the call processing controller 62 of the eNB 31 of radio resource information to be allocated to the UE 34 (for example, the RB assignment information), for example. The call processing controller 62, upon receiving the radio resource change request from the eNB, changes radio resources to be allocated to the UE 34, and returns a response to the eNB 32. The call processing controller of the eNB 32, upon receiving the response from the eNB 31, changes the allocation information of radio resources of the UE 34. For example, the call processing controller of the eNB 32 changes the information of radio resources expected by the eNB 31.

A case where there is a request for releasing radio resources of the CA in the Scell of another station will be described. The following processing corresponds to the processing in the dotted line frame D15 of FIG. 12, for example.

The call processing controller of the eNB 32 detects release of radio resources which have been allocated to the UE 34. For example, when the radio resources allocated to the UE 34 are allocated to a UE having higher priority than the UE 34, the call processing controller of the eNB 32 detects the release of the radio resources.

The call processing controller of the eNB 32 makes a release request of radio resources to the call processing controller 62 of the eNB 31. The call processing controller 62 of the eNB 31, upon receiving the radio resource release request from the eNB, releases the Scell of the eNB 32. The call processing controller 62 returns a response to the radio resource release request, to the eNB 32. In addition, the call processing controller 62 notifies the UE 34 that the Scell of the eNB 32 has been released.

The call processing controller of the eNB 32, upon receiving the response to the radio resource release request from the eNB 31, allocates radio resources which have been allocated to the UE 34 to a UE having higher priority.

Change of the Pcell will be described.

The call processing controller 62 of the eNB 31 changes the Pcell to a cell of a frequency band whose communication quality is good. For example, when the UE 34 moves, the frequency band whose communication quality is good changes. In this case, the call processing controller 62 of the eNB 31 changes the cell of the frequency band whose communication quality is the best, to the Pcell.

In this way, the call processing controller 62 and BB processor 63 of the eNB 31 are designed to transfer a part of data to be CA-transmitted, to the eNB 32, so that data transmission to the UE 34 is performed in the eNB 32 of another station. In addition, the BB processor of the eNB 32 receives data which the eNB 31 transfers, and transmits the data to the UE 34. Thereby, since the eNB 31 adds the frequency band of the eNB 32 of another station to the CA of the eNB 31 and performs data transmission to the UE 34, higher-speed and larger-capacity of data communication may be achieved.

In addition, the call processing controller 62 and BB processor 63 of the eNB 31 stop data transmission to the UE 34, and stop data transfer to the eNB 32, when the retention amount and retention time of data to be transmitted to the UE 34 have become no more than a prescribed threshold value. Thereby, the eNB 31 is able to appropriately allocate radio resources to UEs served by the eNB 31.

In addition, the call processing controller 62 of the eNB 31 changes allocation of radio resources to the UE 34, in accordance with a request from the eNB 32 of another station. In addition, the call processing controller 62 of the eNB 31 notifies the UE 34 that a cell where radio communication has been performed with the eNB 32 has been released, in accordance with a request from the eNB 32 of another station. Thereby, the eNB 32 is able to appropriately allocate radio resources to UEs served by the eNB 32.

With respect to the above, only a principle of the present invention is provided herein. Furthermore, a large number of alterations and modifications could be possible for a person skilled in the art, and the present invention is not limited to exact configurations and applications which have been illustrated and described above, and all the corresponding modification examples and equivalents are construed within the scope of the present invention on the basis of accompanying claims and equivalents thereof.

REFERENCE SIGNS LIST

According to the disclosed apparatus, it is possible to achieve higher speed and larger capacity of data communication.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A base station, comprising:
   a transmitter which transmits data to a radio terminal using a plurality of frequency bands in a carrier aggregation;
   a transfer circuit which transfers a part of data to be transmitted in the transmitter to another base station so that data transmission to the radio terminal is performed in said another base station,
   a storage which stores a plurality of frequency bands with which the radio terminal, the base station and said another base station are able to perform communication;
   a selector which selects, out of the plurality of frequency bands stored, frequency bands with which the radio terminal is able to perform radio communication with the base station and said another base station; and
   a monitor which makes the radio terminal monitor whether radio communication is able to be performed with the base station and said another base station with the frequency bands selected by the selector;
   wherein:
   the transmitter starts data transmission with a first frequency band to the radio terminal,
   when both or one of a retention amount and a retention time of data to be transmitted to the radio terminal exceeds a threshold value, the monitor instructs the radio terminal to start monitoring of different-frequency bands which are different from a current frequency band by which the radio terminal is communicating, when the base station receives a first monitoring result with a first detection notification of a second frequency band from the radio terminal which is different from the first frequency band and is used by the base station, the transmitter transmits the data using both the first frequency band and the second frequency band to the radio terminal, so that the base station adds the second frequency band of the base station to the first frequency band of the base station and performs the data transmission to the radio terminal, when both or one of the retention amount and the retention time exceeds the threshold value and the base station receives a second monitoring result with a second detection notification of a third frequency band used by the another base station from the radio terminal, the monitor instructs the radio terminal to stop monitoring of the different-frequency bands and the transfer circuit starts to transfer the part of data to the another base station, and the part of data transferred by the transfer circuit is transmitted to the radio terminal with the third frequency band different from the first frequency band and the second frequency band by the another base station, so that the base station adds the third frequency band of the another base station to the first frequency band of the base station and performs the data transmission to the radio terminal.

2. The base station according to claim 1, further comprising:
a requesting circuit which makes a radio resource allocation request for information as to whether or not allocation of radio resources to the radio terminal is possible, to said another base station; and
a receiver which receives a result on whether or not the allocation of radio resources to the radio terminal is possible, from said another base station.

3. The base station according to claim 2, wherein
the receiver, when making the radio resource allocation request, transmits information indicating resource blocks which are desired to be allocated to the radio terminal, and a period thereof, to said another base station.

4. The base station according to claim 1, further comprising:
a measuring circuit which measures a time needed for data transfer by the transfer circuit; and
a scheduling circuit which performs scheduling of the radio terminal based on the time measured by the measuring circuit.

5. The base station according to claim 1, wherein the frequency bands selected by the selector are close to frequency bands of a primary cell of the transmitter.

6. The base station according to claim 1, wherein
the transmitter stops data transmission based on both or one of a retention amount and retention time of data to be transmitted to the radio terminal, and
the transfer circuit stops data transfer based on both or one of the retention amount and the retention time.

7. The base station according to claim 1, further comprising:
a changing circuit which changes allocation of radio resources to the radio terminal in accordance with a radio resource change request from said another base station.

8. The base station according to claim 1, further comprising:
a notification circuit which notifies the radio terminal that a cell in which radio communication has been performed with said another base station has been released, in accordance with a radio resource release request from said another base station.

* * * * *